US011357002B2

(12) United States Patent
Hosseini et al.

(10) Patent No.: US 11,357,002 B2
(45) Date of Patent: Jun. 7, 2022

(54) TRANSMISSION TIME INTERVAL INTEGRATION FOR MULTIPLE RADIO ACCESS TECHNOLOGIES

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/403,187

(22) Filed: May 3, 2019

(65) Prior Publication Data

US 2019/0342888 A1 Nov. 7, 2019

Related U.S. Application Data

(60) Provisional application No. 62/668,195, filed on May 7, 2018.

(51) Int. Cl.
*H04W 72/04* (2009.01)
*H04W 72/10* (2009.01)
*H04W 72/00* (2009.01)

(52) U.S. Cl.
CPC ..... *H04W 72/0446* (2013.01); *H04W 72/005* (2013.01); *H04W 72/0413* (2013.01); *H04W 72/10* (2013.01)

(58) Field of Classification Search
CPC . H04L 1/1854; H04L 5/0055; H04W 72/0446
See application file for complete search history.

(56) References Cited

U.S. PATENT DOCUMENTS

2016/0174238 A1 6/2016 Chen et al.
2017/0325246 A1 11/2017 Agarwal et al.
(Continued)

FOREIGN PATENT DOCUMENTS

WO WO-2017117340 A1 7/2017
WO WO-2018029493 A1 2/2018

OTHER PUBLICATIONS

Partial International Search Report—PCT/US2019/030920—ISA/EPO—dated Aug. 6, 2019.
(Continued)

*Primary Examiner* — Phirin Sam
*Assistant Examiner* — Debebe A Asefa
(74) *Attorney, Agent, or Firm* — Holland & Hart LLP

(57) ABSTRACT

Methods, systems, and devices for wireless communications are described. A base station and a user equipment (UE) may support coexistence of more than one radio access technology (RAT), where one of the RATs supports shortened transmission time intervals (sTTIs). Efficient techniques are described for enabling a coexistence between sTTIs associated with a first RAT and TTIs associated with a second RAT. The techniques may include indicating a layout that can accommodate the RATs, multiplexing subslots and slots for the RATs, rate-matching for the second RAT based on signaling around sTTI resources, dropping sTTIs for the first RAT or TTIs for the second RAT based on a collision of processing the TTIs or sTTIs, a single uplink operation for the UE, transmitting uplink control information for one RAT with an uplink channel for the other RAT, configuring power control settings for the first and second RAT, or a combination thereof.

30 Claims, 23 Drawing Sheets

(56) References Cited

U.S. PATENT DOCUMENTS

| | | | |
|---|---|---|---|
| 2017/0332359 A1* | 11/2017 | Tsai | H04B 7/0639 |
| 2018/0007673 A1 | 1/2018 | Fwu et al. | |
| 2018/0083743 A1 | 3/2018 | Chen et al. | |
| 2018/0234998 A1* | 8/2018 | You | H04L 5/0053 |
| 2019/0098611 A1* | 3/2019 | Shimezawa | H04L 5/0044 |

OTHER PUBLICATIONS

International Search Report and Written Opinion—PCT/US2019/030920—ISA/EPO—dated Oct. 29, 2019.
NTT DOCOMO et al., "New Radio (NR) Access Technology", 3GPP Draft; RP-171783 SR ON NR-WID, 3rd Generation Partnership Project (3GPP), Mobile Competence Centre; 650, Route Des Lucioles; F-06921 Sophia-Antipolis Cedex; France, vol. TSG RAN, No. Sapporo, Japan; Sep. 11, 2017-Sep. 14, 2017, Sep. 6, 2017 (Sep. 6, 2017), XP051668625, 283 Pages, Retrieved from the Internet: URL:http://www.3gpp.org/ftp/tsg%5Fran/TSG%5FRAN/TSGR%5F77/Docs/RP%2D171783%2Ezip [retrieved on Sep. 6, 2017], Section: Scheduling and HARQ Aspects; p. 52-p. 63.

* cited by examiner

Key

Control Signal 230

TRANSMISSION TIME INTERVAL INTEGRATION FOR MULTIPLE RADIO ACCESS TECHNOLOGIES

CROSS REFERENCE

The present Application for Patent claims the benefit of U.S. Provisional Patent Application No. 62/668,195 by Hosseini et al., entitled "TRANSMISSION TIME INTERVAL INTEGRATION FOR MULTIPLE RADIO ACCESS TECHNOLOGIES," filed May 7, 2018, assigned to the assignee hereof, and which is expressly incorporated by reference in its entirety herein.

BACKGROUND

The following relates generally to wireless communications, and more specifically to transmission time interval (TTI) integration for multiple radio access technologies (RATs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems, where each system may be referred to as a RAT. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each supporting communication for multiple communication devices, which may be otherwise known as a user equipment (UE). In some cases, a coexistence between two RATs may be present, where resources between the two RATs may be shared for communications between a base station and one or more UEs. The two RATs, however, may use different TTI durations for communications, where one of the RATs utilizes shortened TTIs (sTTIs). Efficient techniques are desired for supporting coexistence between the two RATs utilizing different TTI durations.

SUMMARY

The described techniques relate to improved methods, systems, devices, and apparatuses that support transmission time interval (TTI) integration and related communication for multiple radio access technologies (RATs). Generally, the described techniques provide for coexistence of more than one RAT (e.g., simultaneous communications on the more than one RAT in some cases), where one of the RATs supports shortened TTIs (sTTIs). Techniques are described for enabling a coexistence between sTTIs associated with a first RAT (e.g., Long Term Evolution (LTE)) and TTIs associated with a second RAT (e.g., New Radio (NR)). The techniques described herein may include indicating a layout that can accommodate or facilitate communications based on both RATs, multiplexing subslots and slots for both RATs, rate-matching for the second RAT based on signaling around sTTI resources, dropping sTTIs for the first RAT or TTIs for the second RAT based on a collision of processing one or more of the TTIs and/or sTTIs, a single uplink operation (SUO) for a user equipment (UE), transmitting uplink control information (UCI) for one RAT with an uplink channel for the other RAT, power control settings for the first and second RAT, or a combination thereof.

A method of wireless communications at a UE is described. The method may include receiving, from a base station, a configuration of sTTIs in a subframe using a first RAT, the configuration indicating control format indicator information for the UE and communicating with the base station over TTIs using a second RAT different from the first RAT based on the configuration.

An apparatus for wireless communications at a UE is described. The apparatus may include a processor, memory in electronic communication with the processor, and instructions stored in the memory. The instructions may be executable by the processor to cause the apparatus to receive, from a base station, a configuration of sTTIs in a subframe using a first RAT, the configuration indicating control format indicator information for the UE and communicate with the base station over TTIs using a second RAT different from the first RAT based on the configuration.

Another apparatus for wireless communications at a UE is described. The apparatus may include means for receiving, from a base station, a configuration of sTTIs in a subframe using a first RAT, the configuration indicating control format indicator information for the UE and communicating with the base station over TTIs using a second RAT different from the first RAT based on the configuration.

A non-transitory computer-readable medium storing code for wireless communications at a UE is described. The code may include instructions executable by a processor to receive, from a base station, a configuration of sTTIs in a subframe using a first RAT, the configuration indicating control format indicator information for the UE and communicate with the base station over TTIs using a second RAT different from the first RAT based on the configuration.

In some examples of the method, apparatuses, and non-transitory computer-readable medium described herein, the second RAT may be associated with NR communications.

Some examples of the method, apparatuses, and non-transitory computer-readable medium described herein may further include operations, features, means, or instructions for identifying, based on the configuration, a control format indicator value of the control format indicator information in a shared component carrier (CC), where communicating with the base station over TTIs using the second RAT different from the first RAT may be based on identifying the control format indicator value.

In some examples of the method, apparatuses, and non-transitory computer-readable medium described herein, the control format indicator information may be configured semi-statically.

In some examples of the method, apparatuses, and non-transitory computer-readable medium described herein, a configuration of the TTIs may be a configuration for a multimedia broadcast single frequency network (MBSFN) subframe or a configuration for a non-MBSFN subframe.

Some examples of the method, apparatuses, and non-transitory computer-readable medium described herein may further include operations, features, means, or instructions for identifying, based on the configuration, a control format indicator value from the control format indicator information in at least one symbol in a set of symbols at the beginning of the subframe, where communicating with the base station may be based on identifying the control format indicator value.

In some examples of the method, apparatuses, and non-transitory computer-readable medium described herein, the set of symbols may be three symbols and the at least one symbol may be the three symbols.

In some examples of the method, apparatuses, and non-transitory computer-readable medium described herein, an end of a TTI of the TTIs of the second RAT may be aligned with an end of an sTTI of sTTIs of the first RAT.

In some examples of the method, apparatuses, and non-transitory computer-readable medium described herein, a boundary of each TTI of the TTIs of the second RAT may be aligned with a boundary of a respective sTTI of the sTTIs of the first RAT such that each TTI of the TTIs of the second RAT spans a length less than or equal a length of a respective sTTI of the sTTIs of the first RAT.

In some examples of the method, apparatuses, and non-transitory computer-readable medium described herein, a TTI of the TTIs of the second RAT spans a single sTTI boundary between two sTTIs of the first RAT.

In some examples of the method, apparatuses, and non-transitory computer-readable medium described herein, the sTTIs of the first RAT may be each confined within a slot of the subframe.

Some examples of the method, apparatuses, and non-transitory computer-readable medium described herein may further include operations, features, means, or instructions for receiving, from the base station, a second configuration of sTTIs in a subframe for the first RAT and identifying, based on the second configuration, a control format indicator value from the control format indicator information by decoding a physical control format indicator channel (PC-FICH) or based on a semi-static indication associated with the control format indicator information, where communicating with the base station may be based on the control format indicator value.

In some examples of the method, apparatuses, and non-transitory computer-readable medium described herein, the second configuration of sTTIs may be a configuration for an MBSFN subframe or a configuration for a non-MBSFN subframe.

Some examples of the method, apparatuses, and non-transitory computer-readable medium described herein may further include operations, features, means, or instructions for identifying, based on the configuration, a control format indicator value of the control format indicator information by decoding a PCFICH, where communicating with the base station may be based on the control format indicator value.

Some examples of the method, apparatuses, and non-transitory computer-readable medium described herein may further include operations, features, means, or instructions for determining whether a control format indicator value of the control format indicator information may be greater than a semi-static indication associated with the control format indicator information, where communicating with the base station over TTIs using the second RAT different from the first RAT may be based on whether the control format indicator value of the control format indicator information may be greater than the semi-static indication associated with the control format indicator information.

Some examples of the method, apparatuses, and non-transitory computer-readable medium described herein may further include operations, features, means, or instructions for receiving, from the base station using the first RAT, an sTTI including a first downlink channel for the first RAT, receiving, from the base station using the second RAT, a TTI including a second downlink channel for the second RAT and determine a capability of the UE to decode the first downlink channel for the first RAT and the second downlink channel for the second RAT within an operation constraint.

In some examples of the method, apparatuses, and non-transitory computer-readable medium described herein, the operation constraint includes a timing constraint for the UE, a power constraint for the UE, a bandwidth constraint for the UE, or an enhanced downlink channel may be supported by the first RAT, or a combination thereof.

Some examples of the method, apparatuses, and non-transitory computer-readable medium described herein may further include operations, features, means, or instructions for refraining from decoding one of the first downlink channel for the first RAT and the second downlink channel for the second RAT based on the determined capability.

Some examples of the method, apparatuses, and non-transitory computer-readable medium described herein may further include operations, features, means, or instructions for determining a priority of the first RAT and the second RAT, where refraining from decoding one of the first downlink channel for the first RAT and the second downlink channel for the second RAT based on the determined priority.

In some examples of the method, apparatuses, and non-transitory computer-readable medium described herein, determining the priority of the first RAT and the second RAT may include operations, features, means, or instructions for and determining the priority based on: a total processing time for the UE to decide the first downlink channel and the second downlink channel, or a timing of reception of the sTTI including the first downlink channel and a timing of reception of the TTI including the second downlink channel, the first RAT being associated with LTE and the second RAT being associated with 5G, or a type of traffic for the second RAT being associated with low latency data, or some combination thereof.

Some examples of the method, apparatuses, and non-transitory computer-readable medium described herein may further include operations, features, means, or instructions for determining a constraint on a processing time of the first RAT relative to the second RAT, where refraining from decoding one of the first downlink channel for the first RAT or the second downlink channel for the second RAT may be based on the constraint on the processing time.

In some examples of the method, apparatuses, and non-transitory computer-readable medium described herein, the constraint on the processing time includes the first downlink channel for the first RAT or the second downlink channel for the second RAT being in an exclusion window, a number of resource blocks (RBs), a number of CCs, a maximum transport block size (TBS), a length of a control resource set (CORESET) for the second RAT, a length of a RB set for the first RAT, or a reference signal type used for an sTTI RB set for the first RAT, or a combination thereof.

Some examples of the method, apparatuses, and non-transitory computer-readable medium described herein may further include operations, features, means, or instructions for reporting a size of the exclusion window in a UE capability message, where the size of the exclusion window may be based on a capability of the UE to support different length sTTIs for the first RAT and the configuration of sTTIs, different length TTIs for the second RAT, or both.

Some examples of the method, apparatuses, and non-transitory computer-readable medium described herein may further include operations, features, means, or instructions for identifying a collision of a first uplink message for the first RAT and a second uplink message for the second RAT, determining a priority of the first uplink message or the second uplink message, where the priority may be based on the first RAT and the second RAT, an alignment of a starting boundary for the first uplink message and the second uplink message, the timing of when downlink grants for the first uplink message and the second uplink message may be received, a UE capability, a gap between starting boundaries between the first uplink message and the second uplink message, or a combination thereof and transmitting one of the first uplink message for the first RAT or the second uplink message for the second RAT based on the determined priority, where at least a portion of UCI for the first uplink message or the second uplink message may be transmitted with the other of the first or second uplink message.

Some examples of the method, apparatuses, and non-transitory computer-readable medium described herein may further include operations, features, means, or instructions for allocating a first power for a transmission on one TTI of the TTIs of the second RAT and allocating a second power different from the first power for a transmission on one sTTI of the sTTIs of the first RAT.

In some examples of the method, apparatuses, and non-transitory computer-readable medium described herein, one of the first power or the second power includes a maximum power or a minimum power for the UE.

A method of wireless communications at a UE is described. The method may include receiving, from a base station, a configuration for the UE to operate on a first carrier using a first RAT and on a second carrier using a second RAT different from the first RAT, determining a symbol configuration for a physical uplink control channel (PUCCH) group based on the configuration, the symbol configuration including a length of an sTTI, configuring a timing offset for the UE to transmit an uplink message to the base station based on the determined symbol configuration, and communicating with the base station as part of an SUO using one of the first RAT or the second RAT based on the timing offset.

An apparatus for wireless communications at a UE is described. The apparatus may include a processor, memory in electronic communication with the processor, and instructions stored in the memory. The instructions may be executable by the processor to cause the apparatus to receive, from a base station, a configuration for the UE to operate on a first carrier using a first RAT and on a second carrier using a second RAT different from the first RAT, determine a symbol configuration for a PUCCH group based on the configuration, the symbol configuration including a length of an sTTI, configure a timing offset for the UE to transmit an uplink message to the base station based on the determined symbol configuration, and communicate with the base station as part of an SUO using one of the first RAT or the second RAT based on the timing offset.

Another apparatus for wireless communications at a UE is described. The apparatus may include means for receiving, from a base station, a configuration for the UE to operate on a first carrier using a first RAT and on a second carrier using a second RAT different from the first RAT, determining a symbol configuration for a PUCCH group based on the configuration, the symbol configuration including a length of an sTTI, configuring a timing offset for the UE to transmit an uplink message to the base station based on the determined symbol configuration, and communicating with the base station as part of an SUO using one of the first RAT or the second RAT based on the timing offset.

A non-transitory computer-readable medium storing code for wireless communications at a UE is described. The code may include instructions executable by a processor to receive, from a base station, a configuration for the UE to operate on a first carrier using a first RAT and on a second carrier using a second RAT different from the first RAT, determine a symbol configuration for a PUCCH group based on the configuration, the symbol configuration including a length of an sTTI, configure a timing offset for the UE to transmit an uplink message to the base station based on the determined symbol configuration, and communicate with the base station as part of an SUO using one of the first RAT or the second RAT based on the timing offset.

In some examples of the method, apparatuses, and non-transitory computer-readable medium described herein, the second RAT may be associated with NR communications.

Some examples of the method, apparatuses, and non-transitory computer-readable medium described herein may further include operations, features, means, or instructions for determining a timeline for the UE to transmit an uplink signal to the base station after receiving a downlink signal from the base station based on the determined symbol configuration and the configured timing offset.

In some examples of the method, apparatuses, and non-transitory computer-readable medium described herein, determining the timeline may include operations, features, means, or instructions for determining a timeline related to a downlink/uplink reference configuration based on a first quantity of downlink symbols and a second quantity of uplink symbols within the symbol configuration, where configuring the timing offset may be based on an operation associated with the first RAT or an operation associated with an sTTI.

Some examples of the method, apparatuses, and non-transitory computer-readable medium described herein may further include operations, features, means, or instructions for transmitting the uplink message in a second slot in a second subframe after the timing offset based on receiving a downlink grant in a subslot of a first slot in a first subframe, where the uplink message includes an acknowledgment message and transmitting the uplink message in the second slot in the second subframe after the timing offset based on receiving an uplink grant in a subslot of the first slot in the first subframe, where the uplink message includes a shortened uplink message.

Some examples of the method, apparatuses, and non-transitory computer-readable medium described herein may further include operations, features, means, or instructions for transmitting the uplink message in a second subframe after the timing offset based on receiving a downlink grant in a first subframe, where the uplink message includes an acknowledgement message and transmitting the uplink message in an sTTI in the second subframe after the timing offset based on receiving the downlink grant in an sTTI in the first subframe, where the uplink message includes an acknowledgement message.

In some examples of the method, apparatuses, and non-transitory computer-readable medium described herein, the symbol configuration includes a first quantity of downlink symbols and a second quantity of uplink symbols.

A method of wireless communications at a UE is described. The method may include receiving, from a base station, one or more CORESETs for a TTI using a first RAT, identifying an indication, in a CORESET of the one or more CORESETs, to rate match during a portion of physical downlink shared channel (PDSCH) processing associated with the first RAT when the PDSCH overlaps with RBs for an sTTI of a second RAT different from the first RAT, and performing a rate-matching operation on the PDSCH based on the indication to rate match during the portion of PDSCH processing.

An apparatus for wireless communications at a UE is described. The apparatus may include a processor, memory in electronic communication with the processor, and instructions stored in the memory. The instructions may be executable by the processor to cause the apparatus to receive, from a base station, one or more CORESETs for a TTI using a first RAT, identify an indication, in a CORESET of the one or more CORESETs, to rate match during a portion of PDSCH processing associated with the first RAT when the PDSCH overlaps with RBs for an sTTI of a second RAT different from the first RAT, and perform a rate-matching operation on the PDSCH based on the indication to rate match during the portion of PDSCH processing.

Another apparatus for wireless communications at a UE is described. The apparatus may include means for receiving, from a base station, one or more CORESETs for a TTI using a first RAT, identifying an indication, in a CORESET of the one or more CORESETs, to rate match during a portion of PDSCH processing associated with the first RAT when the PDSCH overlaps with RBs for an sTTI of a second RAT different from the first RAT, and performing a rate-matching operation on the PDSCH based on the indication to rate match during the portion of PDSCH processing.

A non-transitory computer-readable medium storing code for wireless communications at a UE is described. The code may include instructions executable by a processor to receive, from a base station, one or more CORESETs for a TTI using a first RAT, identify an indication, in a CORESET of the one or more CORESETs, to rate match during a portion of PDSCH processing associated with the first RAT when the PDSCH overlaps with RBs for an sTTI of a second RAT different from the first RAT, and perform a rate-matching operation on the PDSCH based on the indication to rate match during the portion of PDSCH processing.

In some examples of the method, apparatuses, and non-transitory computer-readable medium described herein, the first RAT may be associated with NR communications.

In some examples of the method, apparatuses, and non-transitory computer-readable medium described herein, identifying the indication may include operations, features, means, or instructions for identifying the indication to rate match during the portion of PDSCH processing in a subset of one or more CORESETs.

In some examples of the method, apparatuses, and non-transitory computer-readable medium described herein, the rate-matching operation may be based on a preconfigured behavior for the PDSCH overlapping the one or more sets of RBs for the TTI.

In some examples of the method, apparatuses, and non-transitory computer-readable medium described herein, performing the rate-matching operation may include operations, features, means, or instructions for mapping different types of uplink data to respective resource elements in an uplink message.

In some examples of the method, apparatuses, and non-transitory computer-readable medium described herein, one of the one or more CORESETs including the indication to perform the rate-matching operation may be configured semi-statically or dynamically.

In some examples of the method, apparatuses, and non-transitory computer-readable medium described herein, one of the one or more CORESETs including the indication to perform the rate-matching operation may be configured with a monitoring periodicity associated with a control channel of the sTTI.

A method of wireless communications at a base station is described. The method may include transmitting, to a UE, a configuration of sTTIs in a subframe using a first RAT, the configuration indicating control format indicator information for the UE and communicating with the UE over TTIs associated a second RAT different from the first RAT based on the configuration.

An apparatus for wireless communications at a base station is described. The apparatus may include a processor, memory in electronic communication with the processor, and instructions stored in the memory. The instructions may be executable by the processor to cause the apparatus to transmit, to a UE, a configuration of sTTIs in a subframe using a first RAT, the configuration indicating control format indicator information for the UE and communicate with the UE over TTIs associated a second RAT different from the first RAT based on the configuration.

Another apparatus for wireless communications at a base station is described. The apparatus may include means for transmitting, to a UE, a configuration of sTTIs in a subframe using a first RAT, the configuration indicating control format indicator information for the UE and communicating with the UE over TTIs associated a second RAT different from the first RAT based on the configuration.

A non-transitory computer-readable medium storing code for wireless communications at a base station is described. The code may include instructions executable by a processor to transmit, to a UE, a configuration of sTTIs in a subframe using a first RAT, the configuration indicating control format indicator information for the UE and communicate with the UE over TTIs associated a second RAT different from the first RAT based on the configuration.

In some examples of the method, apparatuses, and non-transitory computer-readable medium described herein, the second RAT may be associated with NR communications.

Some examples of the method, apparatuses, and non-transitory computer-readable medium described herein may further include operations, features, means, or instructions for indicating, based on the configuration, a control format indicator value of the control format indicator information in a shared CC, where communicating with the UE over TTIs using the second RAT different from the first RAT may be based on the control format indicator value.

In some examples of the method, apparatuses, and non-transitory computer-readable medium described herein, the control format indicator information may be configured semi-statically.

In some examples of the method, apparatuses, and non-transitory computer-readable medium described herein, a configuration of the TTIs may be a configuration for an MBSFN subframe or a configuration for a non-MBSFN subframe.

Some examples of the method, apparatuses, and non-transitory computer-readable medium described herein may further include operations, features, means, or instructions for transmitting a control format indicator value from the control format indicator information in at least one symbol in a set of symbols at the beginning of the subframe based on the configuration of the sTTIs associated with the first RAT.

In some examples of the method, apparatuses, and non-transitory computer-readable medium described herein, the set of symbols may be three symbols and the at least one symbol may be the three symbols.

In some examples of the method, apparatuses, and non-transitory computer-readable medium described herein, transmitting the configuration using the first RAT may include operations, features, means, or instructions for transmitting one or more sTTIs over the first RAT such that an end of a TTI of the TTIs of the second RAT may be aligned with an end of an sTTI of sTTIs of the first RAT.

In some examples of the method, apparatuses, and non-transitory computer-readable medium described herein, transmitting the configuration using the first RAT may include operations, features, means, or instructions for transmitting one or more sTTIs over the first RAT such that a boundary of each TTI of the TTIs of the second RAT may be aligned with a boundary of a respective sTTI of the sTTIs of the first RAT, where each TTI of the TTIs of the second RAT spans a length less than or equal a length of a respective sTTI of sTTIs of the first RAT.

In some examples of the method, apparatuses, and non-transitory computer-readable medium described herein, transmitting the configuration using the first RAT may include operations, features, means, or instructions for transmitting one or more sTTIs over the first RAT such that a TTI of the TTIs of the second RAT spans an sTTI boundary of two sTTIs of the first RAT.

Some examples of the method, apparatuses, and non-transitory computer-readable medium described herein may further include operations, features, means, or instructions where TTIs of the first RAT may be each confined within a slot of the subframe.

Some examples of the method, apparatuses, and non-transitory computer-readable medium described herein may further include operations, features, means, or instructions for transmitting, to the UE, a second configuration of sTTIs in a subframe for the first RAT and transmitting, based on the second configuration, a control format indicator value of the control format indicator information in a PCFICH or in a semi-static indication associated with the control format indicator information, where communicating with the UE may be based on the control format indicator value.

In some examples of the method, apparatuses, and non-transitory computer-readable medium described herein, the second configuration of sTTIs may be a configuration for an MBSFN subframe or a configuration for a non-MBSFN subframe.

Some examples of the method, apparatuses, and non-transitory computer-readable medium described herein may further include operations, features, means, or instructions for transmitting, based on the configuration, a control format indicator value of the control format indicator information in a PCFICH, where communicating with the UE may be based on the control format indicator value.

Some examples of the method, apparatuses, and non-transitory computer-readable medium described herein may further include operations, features, means, or instructions for transmitting, to the UE using the first RAT, an sTTI including a first downlink channel for the first RAT, transmitting, to the UE using the second RAT, a TTI including a second downlink channel for the second RAT and receiving, from the UE, an acknowledgement message for at least one of the first downlink channel or the second downlink channel based on an operation constraint for the UE.

Some examples of the method, apparatuses, and non-transitory computer-readable medium described herein may further include operations, features, means, or instructions for receiving a size of an exclusion window in a UE capability message, where the acknowledgement message may be received based on the size of the exclusion window.

A method of wireless communications at a base station is described. The method may include identifying one or more sets of RBs for a TTI associated with a first RAT to be transmitted to a UE, the TTI associated with the first RAT including an sTTI, identifying one or more CORESETs to be transmitted to the UE using a TTI using a second RAT, determining that the one or more sets of RBs for the sTTI are within at least one of the one or more CORESETs of the TTI associated with the second RAT, the one of the one or more CORESETs relating to PDSCH processing, and transmitting, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

An apparatus for wireless communications at a base station is described. The apparatus may include a processor, memory in electronic communication with the processor, and instructions stored in the memory. The instructions may be executable by the processor to cause the apparatus to identify one or more sets of RBs for a TTI associated with a first RAT to be transmitted to a UE, the TTI associated with the first RAT including an sTTI, identify one or more CORESETs to be transmitted to the UE using a TTI using a second RAT, determine that the one or more sets of RBs for the sTTI are within at least one of the one or more CORESETs of the TTI associated with the second RAT, the one of the one or more CORESETs relating to PDSCH processing, and transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

Another apparatus for wireless communications at a base station is described. The apparatus may include means for identifying one or more sets of RBs for a TTI associated with a first RAT to be transmitted to a UE, the TTI associated with the first RAT including an sTTI, identifying one or more CORESETs to be transmitted to the UE using a TTI using a second RAT, determining that the one or more sets of RBs for the sTTI are within at least one of the one or more CORESETs of the TTI associated with the second RAT, the one of the one or more CORESETs relating to PDSCH processing, and transmitting, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

A non-transitory computer-readable medium storing code for wireless communications at a base station is described. The code may include instructions executable by a processor to identify one or more sets of RBs for a TTI associated with a first RAT to be transmitted to a UE, the TTI associated with the first RAT including an sTTI, identify one or more CORESETs to be transmitted to the UE using a TTI using a second RAT, determine that the one or more sets of RBs for the sTTI are within at least one of the one or more CORESETs of the TTI associated with the second RAT, the one of the one or more CORESETs relating to PDSCH processing, and transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

In some examples of the method, apparatuses, and non-transitory computer-readable medium described herein, the second RAT may be associated with NR communications.

In some examples of the method, apparatuses, and non-transitory computer-readable medium described herein, the rate-matching operation may be based on a preconfigured behavior for when the one or more sets of RBs for the sTTI may be within the at least one of the one or more CORESETs of the TTI associated with the second RAT.

In some examples of the method, apparatuses, and non-transitory computer-readable medium described herein, the rate-matching operation includes mapping different types of uplink data to respective resource elements in an uplink message.

In some examples of the method, apparatuses, and non-transitory computer-readable medium described herein, one of the one or more CORESETs including the indication to perform the rate-matching operation may be configured semi-statically or dynamically.

DETAILED DESCRIPTION

Figure 1:
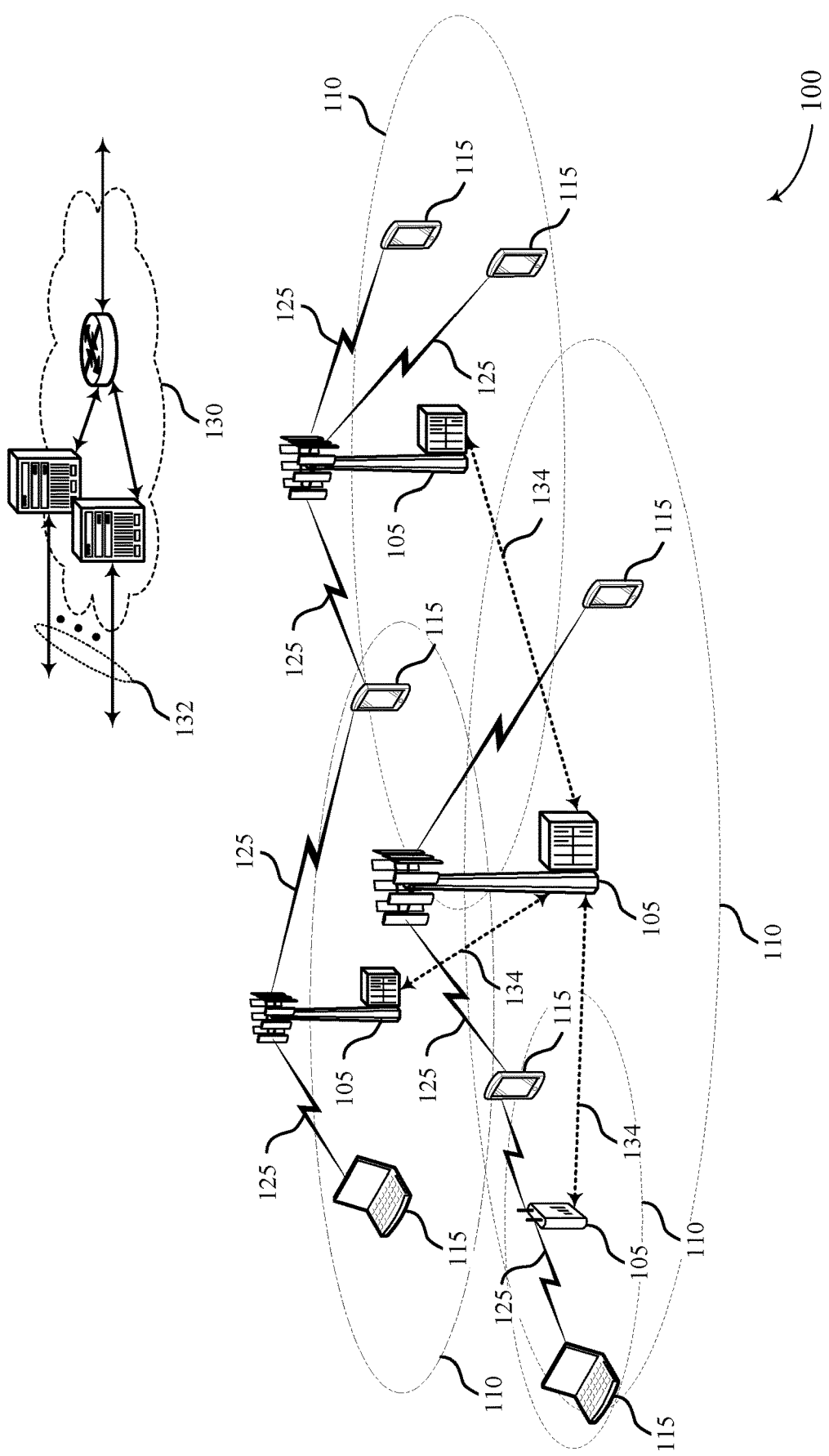
FIG. 1 illustrates an example of a system for wireless communications that supports transmission time interval (TTI) integration for multiple radio access technologies (RATs) in accordance with aspects of the present disclosure.

In some wireless communications systems, a first device (e.g., a base station) and one or more second devices (e.g., user equipments (UEs)) may support multiple radio access technologies (RATs) for communications between each other (e.g., simultaneously or concurrently on the multiple RATs). For example, the base station may provide communications for a first RAT (e.g., Long Term Evolution (LTE) associated with an sTTI) to UEs that support the first RAT, communications for a second RAT (e.g., New Radio (NR)) to UEs that support the second RAT, and communications for both the first and second RAT to UEs that support both RATs. As such, the base station may ensure that each UE supporting a respective RAT may coexist on a same cell properly.

In some cases, to enable this coexistence, the base station may configure downlink and uplink subframes that can support both RATs simultaneously. However, each RAT may utilize a different transmission time interval (TTI) (e.g., different length intervals for downlink and/or uplink communications), such that issues may arise when facilitating the coexistence. For example, the first RAT may support TTIs specific to the second RAT (e.g., LTE TTIs) or shortened TTIs (sTTIs) that are shorter than the TTIs specific to the second RAT, while the second RAT may support different length TTIs specific to the first RAT (e.g., NR TTIs). In some cases, the sTTIs may include lengths of two (2) orthogonal frequency division multiplexing (OFDM) symbols, three (3) OFDM symbols, or seven (7) OFDM symbols, among other examples. The TTIs specific to the second RAT may be different from the first RAT (e.g., longer than the sTTIs). As such, the base station may configure the downlink and uplink subframes to support both the TTIs specific to one or more of the RATs (e.g., the first RAT) and the sTTIs.

Accordingly, the base station may indicate an uplink or downlink layout for sTTIs of the first RAT both for UEs that operate in the first RAT (e.g., LTE) and for UEs that operate in the second RAT (e.g., NR). In some cases, either layout may be indicated by a control format indicator value, where each control format indicator value corresponds to a different layout for an uplink or downlink subframe. UEs that support the first RAT may derive the control format indicator value based on decoding a physical control format indication channel (PCFICH). Alternatively, UEs that support the second RAT may receive the control format indicator value via a semi-static message (e.g., radio resource control (RRC) messaging) or based on assuming a first number of symbols for the subframe (e.g., the first here symbols of the subframe) are unavailable and the remaining symbols of the subframe follow a static configuration.

To support both RATS, the base station may align TTIs for one RAT (e.g., the second RAT, NR, etc.) with symbol and/or TTI boundaries (e.g., sTTI boundaries) for the other RAT (e.g., the first RAT, LTE, etc.) as indicated in the layout. For example, TTIs for the second RAT may not span any boundary for the sTTIs of the first RAT or may only span one boundary for sTTIs of the first RAT. Additionally, a UE operating in the second RAT may perform a rate-matching operation based on sTTI resource block (RB) sets utilized for rate-matching in the first RAT that it receives in one or more control resource sets (CORESETs) as part of a search space for the second RAT.

In some cases, where the UE supports both the first and second RAT, collisions may occur when attempting to process downlink channels or prepare uplink packets for both RATs (e.g., simultaneously, concurrently). Accordingly, the UE may drop processing for one of the associated RAT downlink channels or uplink packets based on a processing time for respective TTIs or sTTIs of either RAT, a priority for one of the RATs, an exclusion window for the downlink channels and/or uplink packets, or a combination thereof. Additionally or alternatively, a UE may be configured for single uplink operation (SUO), where the UE is configured with multiple uplink carriers with at least one carrier being for the first RAT and at least one carrier being for the second RAT, but the UE may operate on one carrier for one RAT at a given time. In some cases, the SUO may include different symbol configurations for receiving downlink symbols and transmitting on corresponding uplink symbols, where the downlink and uplink symbols may include durations of slots (e.g., seven (7) OFDM symbols) and/or subslots (e.g., less than seven (7) OFDM symbols). As such, the UE may follow timeline tables or downlink/uplink reference configurations configured for the first RAT (e.g., for each serving cell) as a basis for determining when to transmit on the uplink symbols after receiving the downlink symbols.

Additionally, when configured to operate in both RATs, a UE may determine that one or more uplink messages are to be sent at the same time. Similar to as described above, the UE may drop processing of an uplink packet for one RAT in favor of an uplink packet for the other RAT. Alternatively, the UE may multiplex different uplink messages together in the time-domain or the frequency domain. However, in some cases, the UE may support transmission of one uplink channel at a time. Accordingly, the UE may include an amount of uplink control information (UCI) for one RAT with a transmission on the uplink channel of the other RAT. The UE may decide which uplink channel to transmit based on an alignment of the uplink channels, a timing of the uplink channels, a configuration of the uplink channels, a gap between the two uplink channels, or a combination thereof. In some cases, the UE may be configured with a maximum or minimum power based on the RAT and on a per sTTI/TTI basis. Additionally or alternatively, when the UE is configured to operate in both RATs (e.g., dual connectivity), operations in the first RAT (e.g., LTE) may follow an approach based on one (1) millisecond (ms) TTIs or may follow the approach as described herein (e.g., based on sTTIs). Which approach to follow may be configured at the UE or dynamically indicated to the UE, which may depend on coordination with a base station (e.g., whether or not operations in the first RAT are enabled for sTTI and/or low latency communications).

Aspects of the disclosure are initially described in the context of a wireless communications system. Additional aspects of the disclosure are then provided through an additional wireless communications system, a processing timeline, an SUO scheme, uplink channel collisions, and process flow examples. Aspects of the disclosure are further illustrated by and described with reference to apparatus diagrams, system diagrams, and flowcharts that relate to TTI integration for multiple RATs.

FIG. 1 illustrates an example of a wireless communications system 100 that supports TTI integration for multiple RATs in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 ms, where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where multiple operators are allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a base station 105 and a UE 115 may support coexistence of more than one RAT (e.g., NR and LTE simultaneously). To enable the coexistence, for example, the base station 105 may support downlink sharing, where the same downlink resources can be shared between two RATs simultaneously, but the UE 115 may not support downlink sharing. In some cases, due to a lack of a spectrum being available for a second RAT as opposed to a first RAT in low frequency bands, the UE 115 may support downlink communications for either the first RAT or the second RAT, but not both. Alternatively, the UE 115 may support a supplemental uplink, where one downlink cell is associated both with an uplink cell for the second RAT and with a supplemental uplink cell, which may be shared between the first RAT and the second RAT. In some cases, the UE 115 may support uplink sharing based on an availability of UEs 115 with multiple transmission chains for a non-standalone (NSA) operation. For example, the UE 115 may use a low band carrier for transmissions in both the first RAT and the second RAT, where the transmissions may be managed through duplexing (e.g., FDD or TDD). Additionally or alternatively, the UE 115 may support an SUO, where the UE 115 is configured with at least one uplink cell for the first RAT and one cell for the second RAT, but the UE 115 may transmit on one uplink cell for either RAT at one time. In some cases, the first RAT (e.g., LTE) may support sTTIs that are shorter than other configured TTIs for the first RAT, and TTIs for the second RAT (e.g., NR) may be longer or shorter than the sTTIs.

Wireless communications system 100 may support efficient techniques for enabling a coexistence between sTTIs associated with a first RAT (e.g., LTE) and TTIs associated with a second RAT (e.g., NR). The techniques may include indicating a layout that can accommodate both RATs, multiplexing subslots and slots for both RATs, rate-matching for the second RAT based on signaling around sTTI resources, dropping sTTIs for the first RAT or TTIs for the second RAT based on a collision of processing the TTIs or sTTIs, an SUO for a UE in the system, transmitting UCI for one RAT with an uplink channel for the other RAT, configuring power control settings for the first and second RAT, or a combination thereof.

Figure 2:
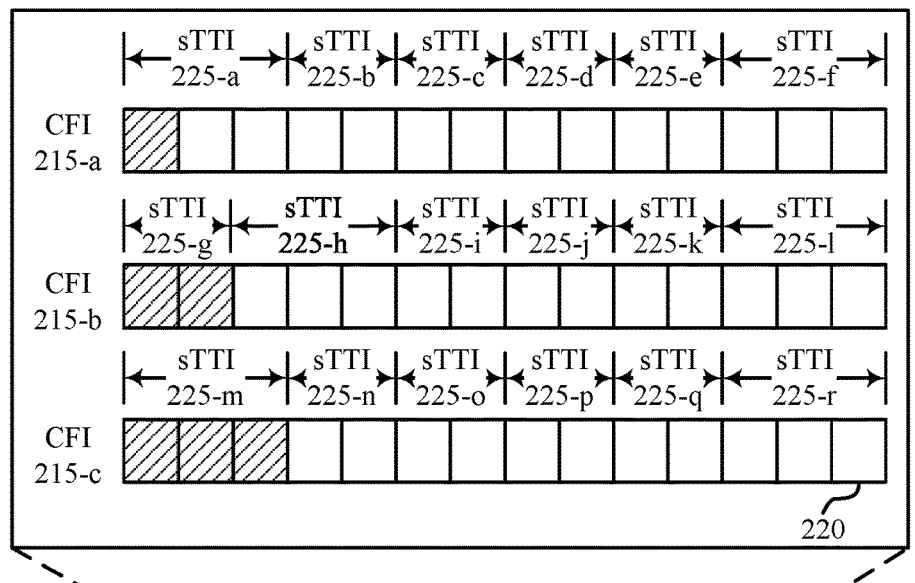
FIG. 2 illustrates an example of a wireless communications system that supports TTI integration for multiple RATs in accordance with aspects of the present disclosure.
Figure 2:
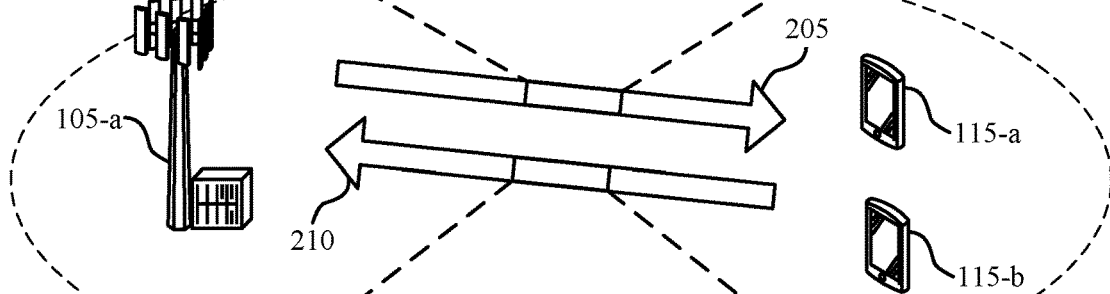
Figure 2:
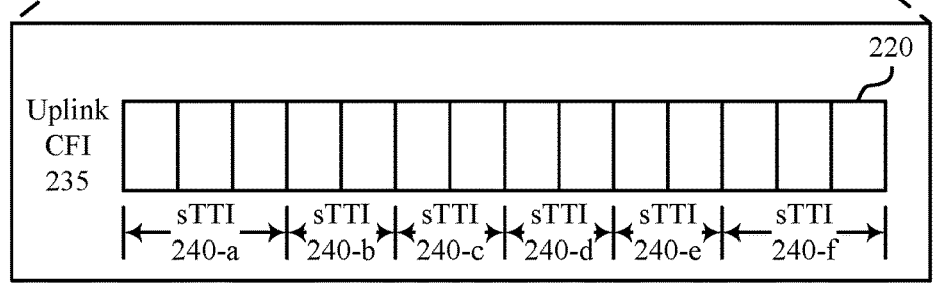
Figure 2:

FIG. 2 illustrates an example of a wireless communications system 200 that supports TTI integration for multiple RATs in accordance with aspects of the present disclosure. In some examples, wireless communications system 200 may implement aspects of wireless communications system 100. Wireless communications system 200 may include a base station 105-a, a UE 115-a, and a UE 115-b, which may be examples of corresponding base stations 105 and UEs 115, respectively, as described above with reference to FIG. 1.

As described herein, base station 105-a may support communications with UEs 115 operating on a first RAT (e.g., LTE) as well as UEs 115 operating on a second RAT (e.g., NR). Accordingly, base station 105-a may ensure that both sets of UEs 115 may coexist properly on a same cell (e.g., of base station 105-a). In some cases, base station 105-a and UEs 115 operating on the first RAT (e.g., UE 115-a) may further support communications over sTTIs, where the sTTIs are shorter than other TTIs used for the first RAT. For example, the sTTIs may include lengths of two (2) OFDM symbols, three (3) OFDM symbols, or seven (7) OFDM symbols, while the other TTIs used for the first RAT may include 14 OFDM symbols. TTIs associated with the second RAT may be shorter than, the same length as, or longer than the sTTIs. In some cases, the sTTIs may be used to transmit low-latency communications (e.g., ultra-reliable low latency communications (URLLC)). Base station 105-a may communicate with both UE 115-a and UE 115-b on resources of a downlink carrier 205 and resources of an uplink carrier 210, where UE 115-a and UE 115-b may operate on different RATs. Additionally or alternatively, UE 115-*a* may operate using sTTIs on the first RAT, and UE 115-*b* may operate using TTIs longer than the sTTIs also on the first RAT.

In some cases, base station 105-*a* may configure a layout of sTTIs for a subframe (e.g., 14 consecutive OFDM symbols) and signal the layout to both UE 115-*a* and UE 115-*b* as a control format indicator value on downlink carrier 205, where different control format indicator values correspond to different sTTI layouts. For example, a first control format indicator value (e.g., CFI1) may indicate a control format indicator 215-*a* for a corresponding first set of sTTIs 225 in the subframe, a second control format indicator value (e.g., CFI2) may indicate a control format indicator 215-*b* for a corresponding second set of sTTIs 225 in the subframe, and a third control format indicator value (e.g., CFI3) may indicate a control format indicator 215-*c* for a corresponding third set of sTTIs 225 in the subframe. Each sTTI 225 may consist of multiple symbols 220. While control format indicators 215-*a*, 215-*b*, and 215-*c* are shown configured for one subframe duration, it is to be understood that the configurations may be indicated for multiple consecutive subframes, for longer than one subframe, for shorter than one subframe, reconfigured on a subframe by subframe basis, or a different configuration not expressly described herein.

In some cases, one or more UEs 115 may identify the control format indicator values from monitoring and decoding a PCFICH. For example, UE 115-*a* (e.g., operating in the first RAT over sTTIs) may decode the PCFICH transmitted in control signals 230 of the subframe to determine the control format indicator value and corresponding sTTI configuration. However, UE 115-*b* (e.g., supporting the second RAT) may not monitor the PCFICH. Accordingly, base station 105-*a* may indicate the control format indicator value in a shared CC utilized for both UE 115-*a* and UE 115-*b*. For example, base station 105-*a* may configure the control format indicator value in the shared CC semi-statically, where the configuration may be determined separately based on a type of the subframe (e.g., for multimedia broadcast single frequency network (MBSFN) or for non-MBSFN). If the control format indication value given by PCFICH is larger than the semi-static value, UE 115-*a* and/or UE 115-*b* may assume an error case. The control format indication value given by PFCICH value may be equal to or smaller than the configured value. If not, control information for the first RAT and data for the second RAT may be mixed.

In some cases, different subframe types may utilize a different number of symbols for a physical downlink channel (PDCCH), so the semi-static indication may be configured separately based on the subframe type (e.g., two (2) symbols for a MBSFN subframe and one (1) or two (2) symbols for a non-MBSFN subframe). Additionally or alternatively, UE 115-*b* may assume that first three (3) symbols of the subframe are unavailable, and base station 105-*a* may refrain from transmitting communications for the second RAT during the corresponding first three (3) symbols of the subframe. For example, base station 105-*a* may transmit control signals 230 for the first RAT in at least one of the first three (3) symbols 220 of the subframe, where UE 115-*a* may receive the control format indicator value to determine the sTTI layout for the accompanying subframe (e.g., in PCFICH) via control signals 230. As such, UE 115-*b* may not monitor the first three (3) symbols.

After the first three (3) symbols of a subframe, the remaining symbols of the subframe may be shared between the first RAT and second RAT such that communications from both RATs may coexist on the same symbols. In some cases, base station 105-*a* may multiplex the communications from and/or for both RATs to support the coexistence. To enable multiplexing between sTTIs 225 of the first RAT and TTIs of the second RAT for subslots (e.g., less than seven (7) OFDM symbols) within a slot, the TTIs of the second RAT may be aligned with boundaries for the first RAT (e.g., symbol or sTTI 225 boundaries for the second RAT). If a TTI of the first RAT spans multiple sTTIs 225, the multiple sTTIs 225 may be blocked by the TTI of the second RAT. Therefore, for example, TTIs of the second RAT may not span sTTI boundaries of the first RAT. That is, each TTI of the first RAT may not partially overlap with more than one sTTI 225.

Additionally or alternatively, a TTI of the first RAT may span a subset of symbols within an sTTI 225 (e.g., a two (2) OFDM symbol (os) NR TTI may consist of two (2) symbols within a 3-os sTTI). However, if a TTI of the second RAT does span both a first and a second sTTI 225, the TTI of the second RAT may align with the end of the second sTTI 225. In some cases, the first RAT and the second RAT may include different numerologies (e.g., different spacings between subcarriers). For example, the second RAT may have a first numerology (e.g., a subcarrier spacing (SCS) of 30 kHz) such that the symbol durations of the second RAT are half the symbol durations of the first RAT. Based on the different numerologies, the TTIs of the second RAT may still not span sTTI boundaries. Additionally or alternatively, an sTTI 225 may span a slot (e.g., a 7-os sTTI), and to enable multiplexing with the slot length sTTI 225, TTIs for the second RAT may be confined within one slot of the subframe (e.g., the TTI for the second RAT may not cross the slot boundary).

Based on the coexistence of the first RAT and the second RAT within the subframe, UE 115-*b* (e.g., operating in the second RAT) may perform a rate-matching operation based on transmissions for both RATs. In each sTTI 225 (except the first sTTI of a subframe), UE 115-*a* (e.g., operating in the first RAT) may be configured with at most two (2) RB sets, where a search space for UE 115-*a* is defined. Additionally or alternatively, UE 115-*b* may be configured with one or more CORESETs, where a search space for UE 115-*b* is defined. In some cases, UE 115-*b* may not be aware of the presence and/or resources assigned to these RB sets. Therefore, when a physical downlink shared channel (PDSCH) for the second RAT overlaps with the sTTI RB sets, a rate-matching behavior for UE 115-*b* may be defined. In addition to the CORESETs configured for UE 115-*b* for a given serving cell, additional CORESETs for rate-matching may be defined in a shared cell, where both semi-static and dynamic rate-matching behaviors for the CORESETs are supported. UE 115-*b* may then follow a behavior intended for each CORESET. In some cases, rate-matching may include mapping different types of data to respective resource elements in an uplink message.

Base station 105-*a* may ensure that the sTTI RB sets are within at least one of the additional CORESETs and indicate that UE 115-*b* may rate-match around resources used for an sTTI downlink channel of the first RAT (e.g., sTTI PDCCH). In some cases, the sTTI RB sets for UE 115-*a* and the CORESETs for UE 115-*b* may be configured separately based on a subframe type (e.g., MBSFN or non-MBSFN). UE 115-*b* may monitor for CORESETs according to a same periodicity that UE 115-*a* utilizes for monitoring for the sTTI downlink channel. For example, the periodicity may be every slot if a slot length sTTI is configured or may be every two (2) symbols if a 2-os length sTTI is configured.

In some cases, UE 115-*a* may support both the first RAT (e.g., LTE) and the second RAT (e.g., NR) simultaneously on a same cell. In such cases, the control format indicator value may be configured for operations according to the second RAT. For operations on the first and/or second RAT, UE 115-*a* may derive the control format indicator value by decoding PCFICH. Additionally or alternatively, the control format indicator value may be indicated semi-statically for operations for the first RAT (e.g., configured sTTIs or subframes for the first RAT) and/or for the second RAT (e.g., configured TTIs for the second RAT). The control format indicator value may be configured separately based on the type of subframe (e.g., MBSFN or non-MBSFN) as described above. Additionally, for rate-matching, as described above, UE 115-*a* may be configured with additional CORESETs in a shared CC and, accordingly, may be indicated a rate-matching behavior based on the CORESETs.

Alternatively, UE 115-*a* may follow a rate-matching behavior for the second RAT based on a rate-matching behavior for sTTIs of the first RAT. For example, for each sTTI RB set, a rate-matching behavior may be defined, and for the rate-matching behavior for the second RAT, UE 115-*b* may follow the same behavior for a downlink channel (e.g., PDSCH) in the second RAT within each sTTI 225. However, if a sTTI RB set spans two (2) OFDM symbols in a 2-os sTTI, but the downlink channel for the second RAT spans the first symbol and not the second symbol, UE 115-*a* may wait to decode an sTTI downlink channel (e.g., PDCCH) over the two (2) OFDM symbols first to infer the rate-matching behavior and, therefore, may miss the downlink channel for the second RAT. UE 115-*a* may be configured to follow one of the rate-matching behaviors described above based on a UE capability (e.g., processing speed). For example, if UE 115-*a* can process the sTTI RB set fast enough (e.g., before a subsequent downlink channel is received and needed to be processed), UE 115-*a* may follow rate-matching behaviors for the second RAT based on the first RAT rate-matching behaviors. Additionally, if the downlink channels for both RATs include a same length, UE 115-*a* may follow rate-matching behaviors for the second RAT based on rate-matching behaviors for the first RAT.

For uplink transmissions, UE 115-*a* and/or UE 115-*b* may communicate with base station 105-*a* on resources of an uplink carrier 210. Accordingly, a layout for utilizing a shared cell for the second RAT may be compatible with a layout of sTTIs 240 for the first RAT as described above, where the layout may be indicated via an uplink channel format indicator 235. For example, a TTI for uplink transmissions in the second RAT (e.g., NR physical uplink shared channel (PUSCH) and PUCCH) may be confined within an uplink sTTI 240 (e.g., either spanning a subset of symbols of the sTTI 240 or all of the sTTI 240 regardless of the numerology). Additionally, the TTI for uplink transmissions in the second RAT may not cross a slot boundary for the first RAT to enable efficient multiplexing with a TTI or an sTTI 240 having a slot duration. To ensure that uplink transmissions from UEs 115 in both the first RAT and the second RAT do not collide, UE-specific uplink resource offsets (e.g., PUCCH resource offsets) may be utilized for operation in the second RAT to be used in the shared cell.

In some cases, an uplink power split may be performed for UE 115-*a* between the first RAT and the second RAT on a per sTTI and TTI basis when UE 115-*a* supports both RATs simultaneously on the same cell. For the first RAT, UE 115-*a* may be configured with a maximum or minimum power for TTIs of the first RAT and a maximum or minimum power for each sTTI duration of the first RAT. For example, if UE 115-*a* transmits one (1) ms TTIs, a 10 dBm maximum power may be configured for the respective TTIs. If UE 115-*a* transmits 2-os sTTIs, a 13 dBm maximum power may be configured for the respective sTTIs. The 2-os sTTI may have a higher maximum power because it has a shorter time duration and, therefore, less impact on overall signal processing at the UE 115 based on the shorter duration. For the second RAT, UE 115-*a* may be configured with a maximum or minimum power for TTIs of the second RAT. UE 115-*a* may be configured with either a maximum or a minimum power based on whether the corresponding RAT is an anchor for UE 115-*a* or not, where if the RAT is an anchor, then a minimum power may be configured for UE 115-*a* for the corresponding RAT.

Additionally or alternatively, when UE 115-*a* is configured to operate in both RATs (e.g., E-UTRAN NR-dual connectivity (EN-DC)), operations in the first RAT (e.g., LTE or E-UTRAN) may follow an approach based on 1 ms TTIs previously defined or may follow the approach as described herein (e.g., based on sTTIs). Which approach to follow may be configured at UE 115-*a* or dynamically indicated to UE 115-*a*, which may further depend on coordination with base station 105-*a* (e.g., whether or not operations in the first RAT are enabled for sTTI and/or URLLC).

Figure 3A:
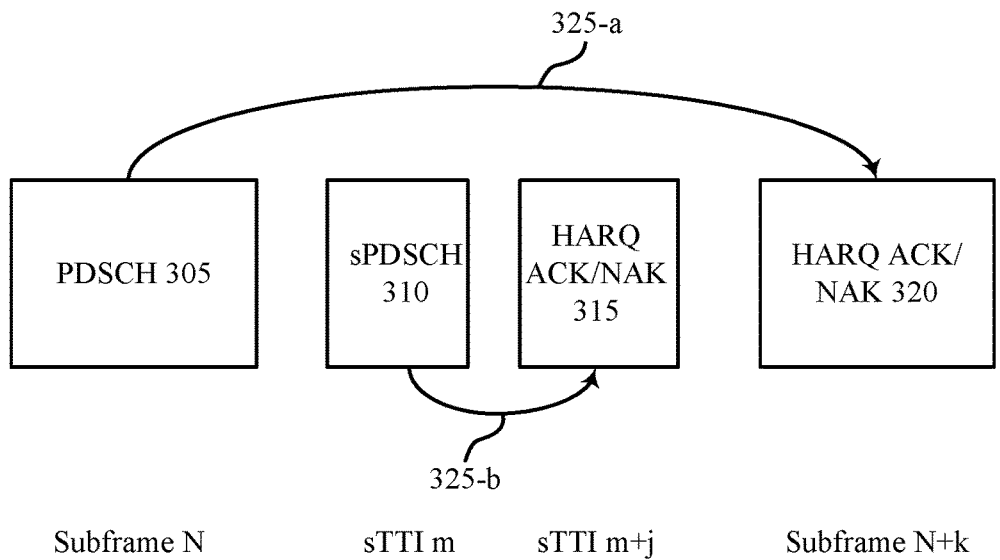
FIGS. 3A and 3B illustrate an example of a processing timeline that supports TTI integration for multiple RATs in accordance with aspects of the present disclosure.

FIG. 3A illustrates an example of a processing timeline 300 that supports TTI integration for multiple RATs in accordance with aspects of the present disclosure. In some examples, processing timeline 300 may implement aspects of wireless communications systems 100 and/or 200. As described herein, a UE 115 may support communications on a first RAT (e.g., LTE) and a second RAT (e.g., NR) simultaneously, where the first RAT supports sTTIs.

Accordingly, collisions may exist for processing (e.g., decoding) respective downlink channels for both RATs because sTTIs of the first RAT and TTIs of the second RAT may have different HARQ timelines (e.g., processing timelines). Depending on a capability timeline for the UE 115, a HARQ timeline for the first RAT may be longer or shorter than a HARQ timeline for an sTTI. For example, the UE 115 may receive a PDSCH 305 over TTIs of the second RAT in subframe N and, consequently, may transmit a HARQ acknowledgement/negative acknowledgement (ACK/NAK) 320 in subframe N+k after a time 325-*a*, where the UE 115 processes PDSCH 305 and prepares HARQ ACK/NAK 320 during time 325-*a*. Additionally or alternatively, the UE 115 may receive a shortened PDSCH (sPDSCH) 310 in sTTI m of the first RAT and consequently transmit a HARQ ACK/NAK 315 in sTTI m+j after a time 325-*b*, where the UE 115 processes sPDSCH 310 and prepares HARQ ACK/NAK 315 during time 325-*b*. Alternatively, although not shown, the HARQ timeline for the second RAT may be shorter than the HARQ timeline for the first RAT. As such, the UE 115 may be in the middle of processing an sTTI downlink channel (e.g., sPDSCH 310), when it may start processing a downlink channel for the second RAT (e.g., PDSCH 305), which has a shorter turnaround processing time. In some cases, processing the downlink channels may include decoding the downlink channels to determine corresponding information for the UE 115. A maximum timing advance (e.g., time between receiving a downlink channel and transmitting an uplink channel) may be limited when the UE 115 supports simultaneous operation in both RATs.

However, in both cases, the UE 115 may not be able to decode both sPDSCH 310 and PDSCH 305 simultaneously and may drop one of the two downlink channels. For example, the UE 115 may determine an inability to decode both downlink channels based on an operation constraint, where the operation constraint includes a timing constraint, a power constraint, a bandwidth constraint, or whether enhanced PDCCH scheduling for the first RAT is allowed. Accordingly, if PDSCH 305 has a lower processing time (e.g., time 325-*a* is less than time 325-*b*), then processing of some of the sTTIs received prior to PDSCH 305 may be dropped. Additionally or alternatively, if sPDSCH 310 has a lower processing time (e.g., time 325-*b* is less than time 325-*a*), the UE 115 may drop processing of PDSCH 305, or the UE 115 may drop the processing of sPDSCH 310 and process PDSCH 305 instead based on a determined priority for the second RAT over the first RAT. In some cases, the UE 115 may drop processing of one or more downlink channels across different CCs, where the UE 115 is unable to simultaneously process the downlink channels for each CC. For example, if the UE 115 determines to drop an sPDSCH, then the UE 115 may determine which sPDSCH to drop (i.e., over which CCs to drop the sPDSCH). Additionally or alternatively, a priority rule may be defined to determine which sPDSCH to drop on which CC (e.g., an sPDSCH on a CC with the largest index may be dropped).

Figure 3B:
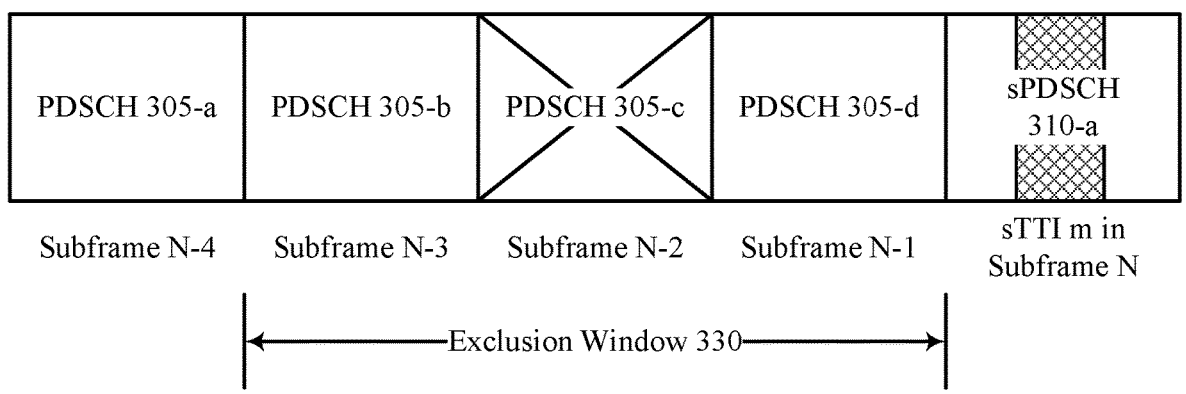

FIG. 3B illustrates an example of a processing timeline 301 that supports TTI integration for multiple RATs in accordance with aspects of the present disclosure. In some examples, processing timeline 301 may implement aspects of wireless communications systems 100 and/or 200. As described above, a UE 115 may support communications on a first RAT (e.g., LTE) and a second RAT (e.g., NR) simultaneously, where the first RAT supports sTTIs, and a collision may occur when the UE 115 attempts to process downlink channels for both RATs simultaneously. Accordingly, the UE 115 may drop processing of one or more downlink channels to mitigate the collision.

In some cases, an exclusion window 330 may be defined for an sPDSCH 310-*a* and/or a downlink channel for the first RAT, where the UE 115 determines which PDSCHs 305 and/or sTTI downlink channels, respectively, to drop processing for based on exclusion window 330. For example, exclusion window 330 may include a size of three subframes that include subframes N−1, N−2, and N−3 prior to receiving sPDSCH 310-*a* in sTTI m in subframe N. As such, the UE 115 may drop processing of PDSCH 305-*c* in the corresponding subframe N−2 in exclusion window 330 to process sPDSCH 310-*a*. Exclusion window 330 may be reported as a UE capability for an sPDSCH and a PDSCH separately, where the size of exclusion window 330 may depend on whether the UE 115 supports slot and subslot sized sTTIs with the second RAT. Accordingly, when the exclusion window is defined for the UE 115, the processing of which downlink channel to drop may be determined based on UE implementation by the UE 115.

Additionally or alternatively, when the exclusion window is defined for the UE 115, the processing of which downlink channel to drop may be determined based on a set of rules defined according to additional parameters. For example, the UE 115 may determine to drop processing of one of the downlink channels based on a number of RBs for both downlink channels, a number of configured CCs, a maximum transport block size (TBS) for both downlink channels, a length of a CORESET for the second RAT, a length of a RB set for the first RAT, a reference signal type used for sTTI RB sets, whether the downlink channel for the second RAT indicates low latency traffic (e.g., URLLC) or regular traffic (e.g., enhanced mobile broadband (eMBB) communications), or a combination thereof (e.g., constraints on supporting processing sPDSCHs and PDSCHs simultaneously). As such, the exclusion window and the rules defined according to the additional parameters may be utilized separately or together for the UE 115 to determine which downlink channel processing to drop.

Additionally or alternatively, although not shown, the UE 115 may be unable to process and prepare uplink packets triggered by both the first and second RAT simultaneously. As such, similar to the process described above when handling downlink message processing for both the first and second RAT, an exclusion window may be defined to determine which uplink message processing and preparation to drop. As described above, a dropping rule may be dependent on a timeline for processing uplink packets for the first RAT and the second RAT (e.g., based on a processing time of sTTIs for the first RAT and TTIs for the second RAT). Additionally, similar constraints utilized for downlink message processing may be utilized for processing the uplink packets.

Figure 4:
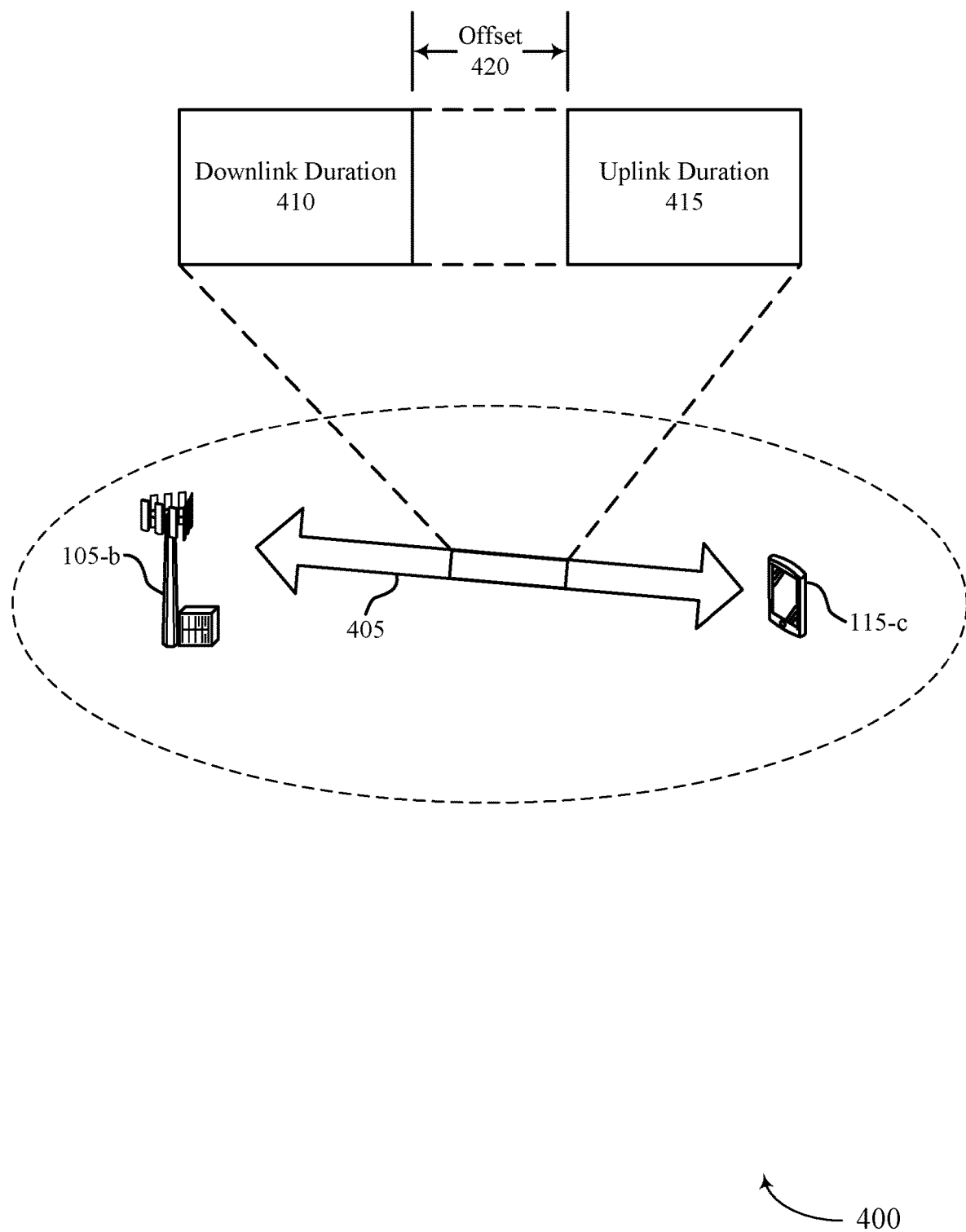
FIG. 4 illustrates an example of a single uplink operation (SUO) scheme that supports TTI integration for multiple RATs in accordance with aspects of the present disclosure.

FIG. 4 illustrates an example of an SUO scheme 400 that supports TTI integration for multiple RATs in accordance with aspects of the present disclosure. In some examples, SUO scheme 400 may implement aspects of wireless communications systems 100 and/or 200. SUO scheme 400 may include a base station 105-*b* and a UE 115-*c*, which may be examples of corresponding base stations 105 and UEs 115, respectively, as described above with reference to FIGS. 1-3. In some cases, UE 115-*c* may be configured for SUO, where UE 115-*c* is configured with multiple uplink carriers with at least one carrier utilized for a first RAT (e.g., LTE) and at least one carrier utilized for a second RAT (e.g., NR), but UE 115-*c* may operate on one carrier for one RAT at a given time. Accordingly, for example, UE 115-*c* may communicate with base station on resources of a carrier 405 over one RAT at a given time.

To accommodate the SUO scheme 400, UE 115-*c* may be configured with a downlink reference uplink/downlink configuration defined for multiple carriers in CA (e.g., LTE-FDD-SCell in LTE-TDD-FDD CA with LTE-TDD-PCell), where the uplink/downlink configuration may include a downlink duration 410 and an uplink duration 415. For scheduling (e.g., HARQ timing) of a carrier for the first RAT (e.g., LTE FDD carrier), the downlink reference uplink/downlink configuration defined for multiple carriers in CA may be applied for UE 115-*c*. As such, in some cases, UE 115-*c* may then transmit uplink signals for the second RAT in at least subframes where uplink transmissions for the first RAT are prohibited according to the downlink reference uplink/downlink configuration. For example, UE 115-*c* may be unable to transmit uplink messages for the first RAT in some of the uplink subframes defined in the uplink/downlink configuration and, accordingly, may transmit uplink messages for the second RAT in uplink occasions for the first RAT at the discretion of a scheduler (e.g., base station 105-*b*).

In some cases, an FDD timing configuration (i.e., periodicity and offset) may be applied to a physical random access channel (PRACH) and sounding reference signal (SRS) for the first RAT on uplink carriers for the first RAT. However, the UE may not transmit PRACHs or SRS for the first RAT that do not coincide with configured HARQ-ACK transmission occasions. Additionally, in some cases, a UE-specific HARQ subframe offset 420 may be configured for UE 115-*c*, where offset 420 (e.g., HARQ_offset) may be in the range of zero (0) to nine (9) symbols between downlink duration 410 and uplink duration 415.

When sTTIs are configured for UE 115-*c* for the first RAT, UE 115-*c* may handle SUO and the coexistence of slot (e.g., seven (7) symbols) and subslot (e.g., less than seven (7) symbols) TTIs based on a symbol configuration. For example, for a first symbol configuration with slot TTI durations in a given PUCCH group, timeline tables utilized for the first RAT (e.g., LTE-TDD-FDD CA with LTE-TDD-PCell timeline tables) may be used for additional cells (e.g., LTE-FDD-SCells) in the PUCCH group, where the first symbol configuration is adopted for the duplexing mode (e.g., TDD). Additionally, UE 115-c may follow reference timelines for operating over TTIs in the second RAT and may follow timelines given by sTTI tables for the first symbol configuration. Offset 420 may be configured separately for sTTIs in the first RAT and for TTIs in the second RAT according to the first symbol configuration. In some cases, the first symbol configuration may include seven (7) downlink symbols for downlink duration 410 followed by seven (7) uplink symbols for uplink duration 415. The timing tables for the first symbol configuration may indicate that for a downlink grant received in a slot n of a subframe m, a HARQ-ACK may be sent in a slot j of a subframe i, and for an uplink grant received in a slot n of a subframe m, a shortened PUSCH (sPUSCH) may be sent in a slot j of a subframe i. However, in some cases, subslot TTIs may not be supported based on a duplexing mode (e.g., TDD) and timeline tables may not be defined for the subslot TTIs.

For a second symbol configuration that includes one subslot TTI duration, reference tables utilized for the first symbol configuration may be utilized for corresponding reference tables. For example, for a downlink grant received in subslots of a slot n of a subframe m, a HARQ-ACK may be sent in a slot j of a subframe i, and for an uplink grant received in subslots of a slot n of a subframe m, an sPUSCH may be sent in a slot j of a subframe i. In some cases, the second symbol configuration may include two (2) downlink symbols in downlink duration 410 followed by seven (7) uplink symbols in uplink duration 415. Additionally or alternatively, for a third symbol configuration that includes two subslot TTI durations, timing tables for TTIs of the first RAT or the reference tables for the first symbol configuration may be utilized. For example, according to the timing tables for TTIs of the first RAT, for a downlink grant received in a subframe n, a HARQ-ACK may be sent in a subframe m. Therefore, for the third symbol configuration, for a downlink grant received in an sTTI j of a subframe n, a HARQ-ACK may be reported in an sTTI j of a subframe m. In some cases, the third symbol configuration may include two (2) downlink symbols followed by two (2) uplink symbols in uplink duration 415. Additionally, offsets 420 may be configured jointly or separately for each of the first, second, and third symbol configurations.

Figure 5A:
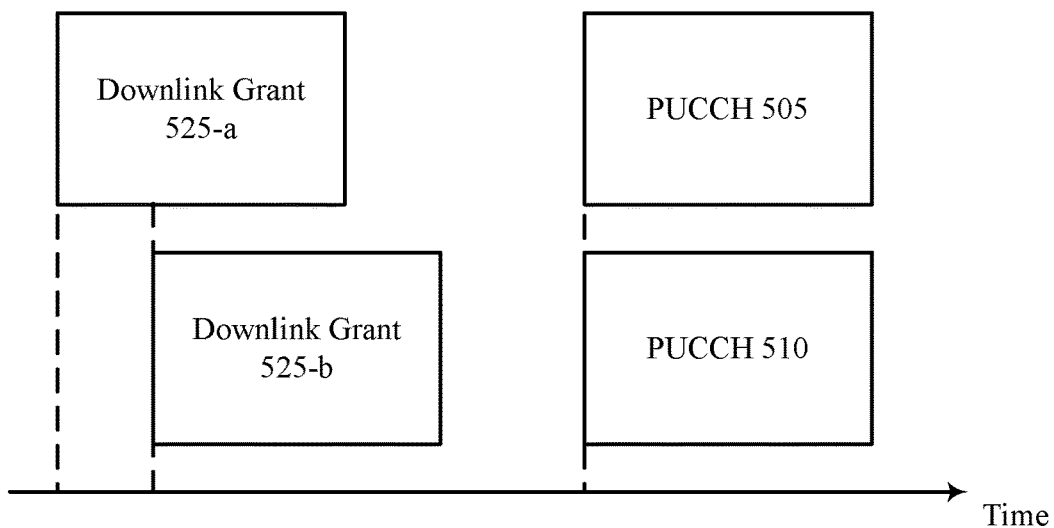
FIGS. 5A and 5B illustrate examples of uplink channel collisions that support TTI integration for multiple RATs in accordance with aspects of the present disclosure.

FIG. 5A illustrates an example of an uplink channel collision 500 that supports TTI integration for multiple RATs in accordance with aspects of the present disclosure. In some examples, uplink channel collision 500 may implement aspects of wireless communications systems 100 and/or 200. As described herein, a UE 115 may support communications on a first RAT (e.g., LTE) and a second RAT (e.g., NR) simultaneously, where the first RAT supports sTTIs.

In some cases, when an uplink cell is shared between sTTIs for the first RAT and TTIs for the second RAT, uplink channels (e.g., PUSCH and PUCCH) for both RATs may be frequency division multiplexed (FDMed) or time division multiplexed (TDMed). If the uplink channels are TDMed, a base station 105 may control the multiplexing. Alternatively, if the uplink channels are FDMed, the UE 115 may report its capability of simultaneously supporting uplink channels for both RATs (e.g., NR and sTTI PUSCH), where the multiplexing is based on the reported capability. For example, if uplink TTIs for both RATs have the same length and fully collide in the time domain, the UE 115 may either multiplex and transmit both uplink TTIs or drop one uplink TTI based on the UE capability. However, if the uplink TTIs partially overlap, the UE 115 may drop one of the two corresponding uplink channels. For example, the UE 115 may drop the uplink channel whose TTI starts later or may drop the uplink channel based on a RAT priority (e.g., NR has a higher priority to LTE).

Alternatively, the UE 115 may not support multiplexing the uplink channels (e.g., PUCCHs and PUSCHs) for both RATs and may transmit one uplink channel at a time. Accordingly, to ensure necessary information for both RATs is transmitted (e.g., HARQ-ACK), the UE 115 may transmit UCI contents for an uplink channel of one of the RATs that is not transmitted with an uplink channel for the other RAT that is transmitted. The UE 115 may choose one of the two uplink channels for the RATs to transmit based on an alignment of the two uplink channels. For example, if the starting boundaries of a PUCCH 505 and a PUCCH 510 (i.e., uplink channels) are aligned, the UE 115 may transmit PUCCH 510 associated with a downlink grant 525-b that is received later than a downlink grant 525-a for PUCCH 505. Alternatively, the UE 115 may determine which PUCCH to transmit based on a configuration of the PUCCHs. As such, the UE 115 may include UCI content (e.g., HARQ-ACK) of PUCCH 505 on the transmission of PUCCH 510, or the UE 115 may drop the UCI content of PUCCH 505, where the UE 115 may select whether to include the UCI content based on a configuration of PUCCH 510.

Figure 5B:
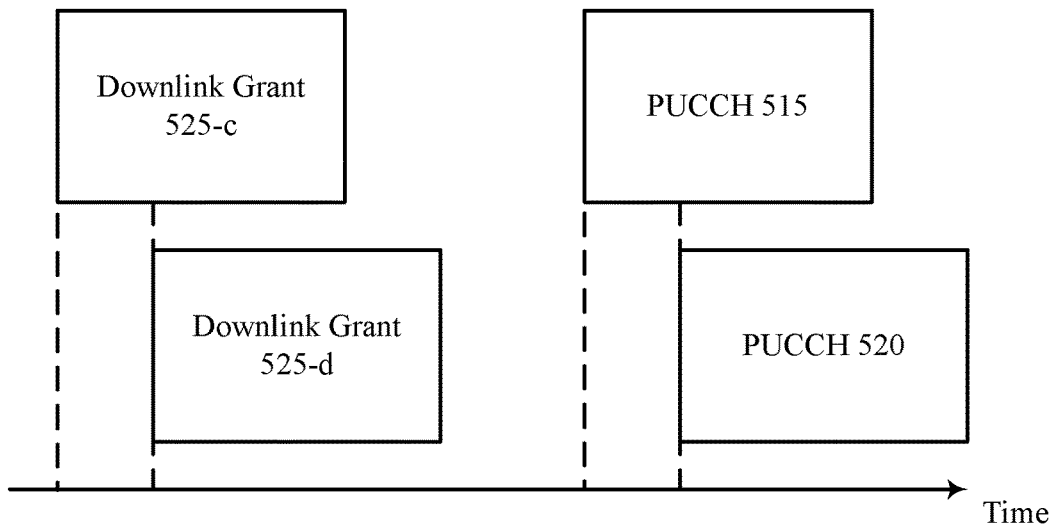

FIG. 5B illustrates an additional example of an uplink channel collision 501 that supports TTI integration for multiple RATs in accordance with aspects of the present disclosure. In some examples, uplink channel collision 501 may implement aspects of wireless communications systems 100 and/or 200. As described above, a UE 115 may support communications on a first RAT (e.g., LTE) and a second RAT (e.g., NR) simultaneously, where the first RAT supports sTTIs. In some cases, the UE 115 may transmit one uplink channel at a time.

Alternative to the scenario described above with reference to FIG. 5A, when the starting boundaries of a PUCCH 515 and a PUCCH 520 are not aligned, the UE 115 may transmit either PUCCH 515 or PUCCH 520. If PUCCH 515 is transmitted, the UE 115 may drop PUCCH 520 or include UCI for PUCCH 520 on PUCCH 515 based on the UE capability and/or the gap between the two starting points of the two PUCCHs. Additionally or alternatively, if PUCCH 520 is transmitted, the UE 115 may transmit the UCI from PUCCH 515 on PUCCH 520 or may drop the UCI from PUCCH 515. Similar to the decision described above with reference to FIG. 5A, the UE 115 may choose which PUCCH to transmit and whether to include UCI for the not chosen PUCCH based on a configuration of the PUCCHs. If tighter aggregation is enabled, uplink channels for the first RAT (e.g., sTTI PUCCH/PUSCH) may carry UCI for the second RAT or may cross-carrier schedule CCs for the second RAT. Additionally, although the above examples describe collisions between two PUCCHs, a collision may occur between a PUCCH for one RAT and a PUSCH for the other RAT. Accordingly, similar techniques may be employed for the collision between a PUCCH and a PUSCH.

Figure 6:
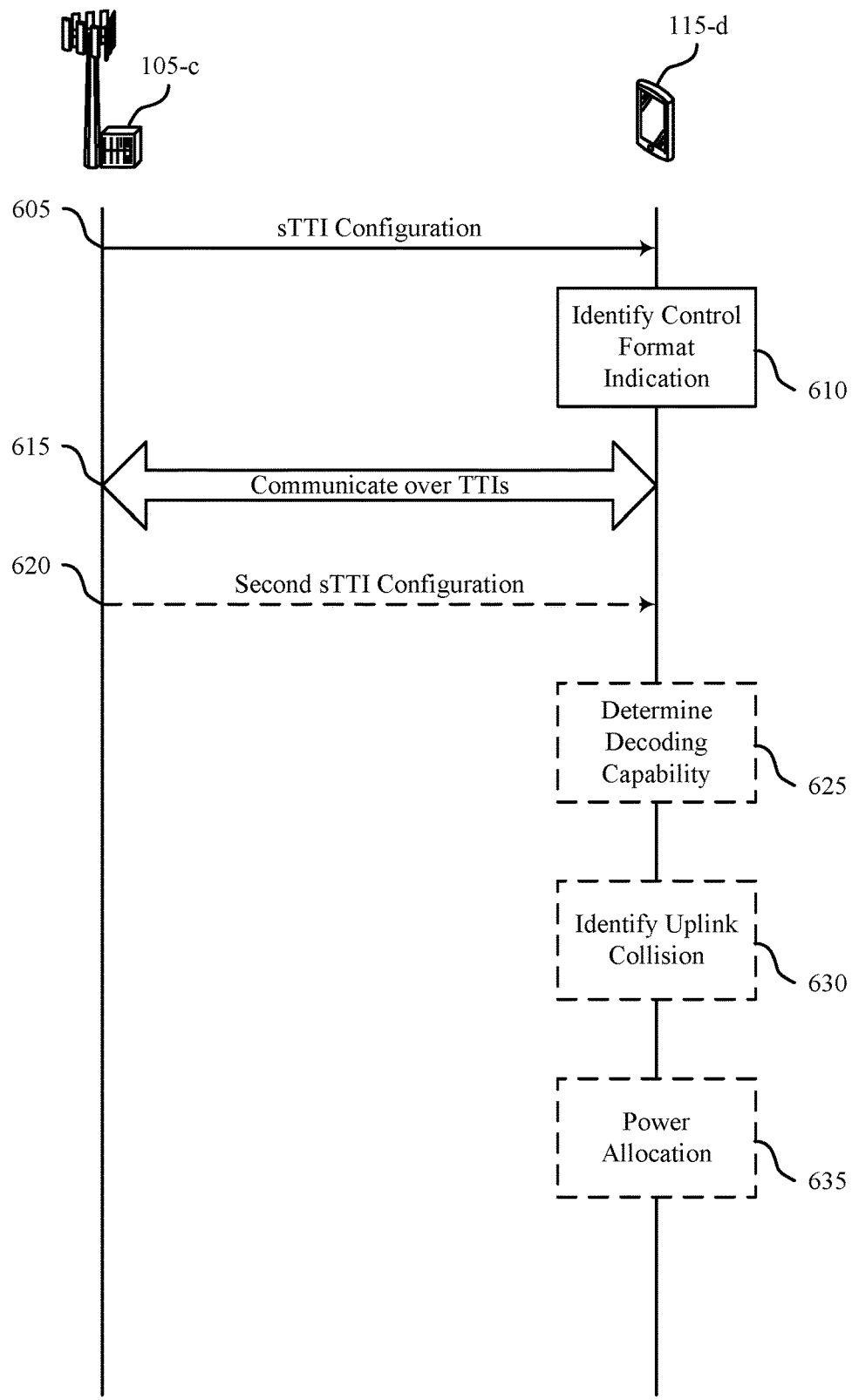
FIGS. 6, 7, and 8 illustrate examples of process flows that support TTI integration for multiple RATs in accordance with aspects of the present disclosure.

FIG. 6 illustrates an example of a process flow 600 that supports TTI integration for multiple RATs in accordance with aspects of the present disclosure. In some examples, process flow 600 may implement aspects of wireless communications systems 100 and/or 200. Process flow 600 may include a base station 105-*c* and a UE 115-*d*, which may be examples of corresponding base stations 105 and UEs 115, respectively, as described above with reference to FIGS. 1-5.

In the following description of the process flow 600, the operations between UE 115-*d* and base station 105-*c* may be performed in different orders or at different times. Certain operations may also be left out of the process flow 600, or other operations may be added to the process flow 600. It is to be understood that while UE 115-*d* and base station 105-*c* are shown performing a number of the operations of process flow 600, any wireless device may perform the operations shown.

At 605, UE 115-*d* may receive, from base station 105-*c*, a configuration of sTTIs in a subframe using a first RAT (e.g., LTE), the configuration indicating control format indicator information for UE 115-*d*.

At 610, UE 115-*d* may identify, based on the configuration, a control format indicator value of the control format indicator information in a shared CC, where communicating with base station 105-*c* over TTIs using a second RAT (e.g., NR) different from the first RAT is based on identifying the control format indicator value. In some cases, the control format indicator information may be configured semi-statically. A configuration of the TTIs for the second RAT may be a configuration for an MBSFN subframe or a configuration for a non-MBSFN subframe. Additionally or alternatively, UE 115-*d* may identify, based on the configuration, a control format indicator value from the control format indicator information in at least one symbol in a set of symbols at the beginning of the subframe, where communicating with base station 105-*c* is based on identifying the control format indicator value. The set of symbols may be three symbols, and the at least one symbol may be the three symbols.

In some cases, an end of a TTI of the TTIs of the second RAT may be aligned with an end of an sTTI of sTTIs of the first RAT. Additionally or alternatively, a boundary of each TTI of the TTIs of the second RAT may be aligned with a boundary of a respective sTTI of the sTTIs of the first RAT such that each TTI of the TTIs of the second RAT spans a length less than or equal a length of a respective sTTI of the sTTIs of the first RAT. In some cases, a TTI of the TTIs of the second RAT may span a single sTTI boundary between two sTTIs of the first RAT. Additionally, the sTTIs of the first RAT may be each confined within a slot of the subframe.

At 615, UE 115-*d* may communicate with base station 105-*c* over TTIs using a second RAT different from the first RAT based on the configuration. In some cases, the second RAT may be associated with NR communications.

At 620, UE 115-*d* may receive, from base station 105-*c*, a second configuration of sTTIs in a subframe for the first RAT. In some cases, UE 115-*d* may identify, based on the second configuration, a control format indicator value from the control format indicator information by decoding a PCFICH or based on a semi-static indication associated with the control format indicator information, where communicating with base station 105-*c* is based on the control format indicator value. Additionally, the second configuration of sTTIs may be a configuration for an MBSFN subframe or a configuration for a non-MBSFN subframe. UE 115-*d* may identify, based on the configuration, a control format indicator value of the control format indicator information by decoding a PCFICH, where communicating with base station 105-*c* is based on the control format indicator value. UE 115-*d* may determine whether the control format indicator value of the control format indicator information is greater than a semi-static indication associated with the control format indicator information, where communicating with base station 105-*c* over TTIs using the second RAT different from the first RAT is based on whether the control format indicator value of the control format indicator information is greater than the semi-static indication associated with the control format indicator information.

In some cases, UE 115-*d* may receive, from base station 105-*c* using the first RAT, an sTTI including a first downlink channel for the first RAT and may also receive, from base station 105-*c* using the second RAT, a TTI including a second downlink channel for the second RAT. Accordingly, at 625, UE 115-*d* may determine a capability to decode the first downlink channel for the first RAT and the second downlink channel for the second RAT within an operation constraint, where the operation constraint includes a timing constraint for UE 115-*d*, a power constraint for UE 115-*d*, a bandwidth constraint for UE 115-*d*, or an enhanced downlink channel is supported by the first RAT, or a combination thereof. Accordingly, UE 115-*d* may refrain from decoding one of the first downlink channel for the first RAT and the second downlink channel for the second RAT based on the determined capability.

Additionally or alternatively, UE 115-*d* may determine a priority of the first RAT and the second RAT, where refraining from decoding one of the first downlink channel for the first RAT and the second downlink channel for the second RAT is based on the determined priority. UE 115-*d* may determine the priority based on a total processing time for the UE to decode the first downlink channel and the second downlink channel, or a timing of reception of the sTTI comprising the first downlink channel and a timing of reception of the TTI comprising the second downlink channel, the first RAT being associated with LTE and the second RAT being associated with 5G, or a type of traffic for the second RAT being associated with low latency data, or some combination thereof.

Additionally or alternatively, UE 115-*d* may determine a constraint on a processing time of the first RAT relative to the second RAT, where refraining from decoding one of the first downlink channel for the first RAT or the second downlink channel for the second RAT is based on the constraint on the processing time. The constraint on the processing time may include the first downlink channel for the first RAT or the second downlink channel for the second RAT being in an exclusion window, a number of RBs, a number of CCs, a maximum TBS, a length of a CORESET for the second RAT, a length of an RB set for the first RAT, or a reference signal type used for an sTTI RB set for the first RAT, or a combination thereof. Accordingly, UE 115-*b* may report a size of the exclusion window in a UE capability message, where the size of the exclusion window is based on a capability of UE 115-*d* to support different length sTTIs for the first RAT and the configuration of sTTIs, different length TTIs for the second RAT, or both.

At 630, UE 115-*d* may identify a collision of a first uplink message for the first RAT and a second uplink message for the second RAT. Accordingly, UE 115-*d* may determine a priority of the first uplink message or the second uplink message, where the priority is based on the first RAT and the second RAT, an alignment of a starting boundary for the first uplink message and the second uplink message, the timing of when downlink grants for the first uplink message and the second uplink message are received, a UE capability, a gap between starting boundaries between the first uplink message and the second uplink message, or a combination thereof. UE 115-*d* may then transmit one of the first uplink message for the first RAT or the second uplink message for the second RAT based on the determined priority, where at least a portion of UCI for the first uplink message or the second uplink message is transmitted with the other of the first or second uplink message.

At 635, UE 115-*d* may allocate a first power for a transmission on one TTI of the TTIs of the second RAT and may allocate a second power different from the first power for a transmission on one sTTI of the sTTIs of the first RAT. In some cases, one of the first power or the second power comprises a maximum power or a minimum power for UE 115-*d*.

Figure 7:
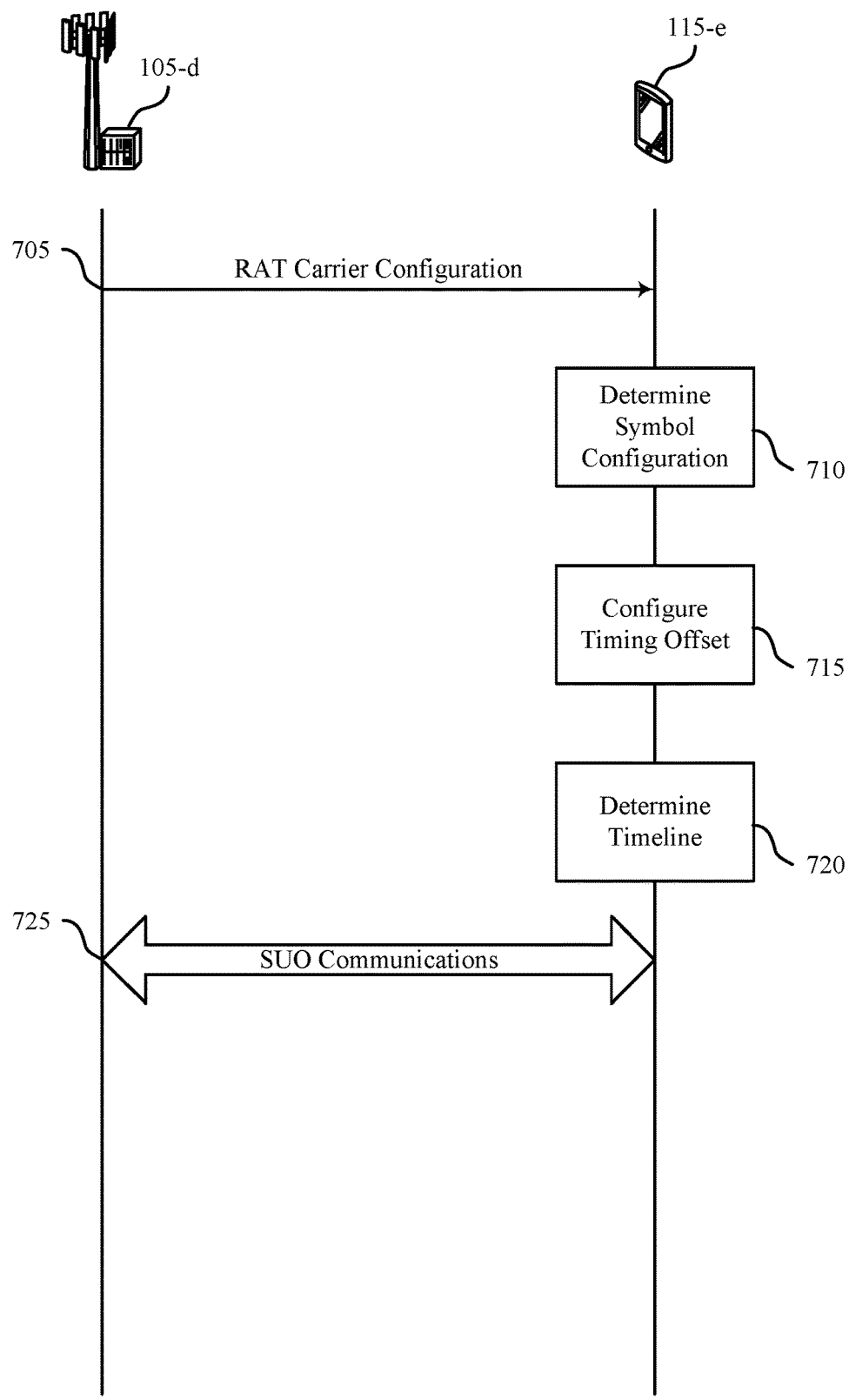

FIG. 7 illustrates an example of a process flow 700 that supports TTI integration for multiple RATs in accordance with aspects of the present disclosure. In some examples, process flow 700 may implement aspects of wireless communications systems 100 and/or 200. Process flow 700 may include a base station 105-*d* and a UE 115-*e*, which may be examples of corresponding base stations 105 and UEs 115, respectively, as described above with reference to FIGS. 1-6.

In the following description of the process flow 700, the operations between UE 115-*e* and base station 105-*d* may be performed in different orders or at different times. Certain operations may also be left out of the process flow 700, or other operations may be added to the process flow 700. It is to be understood that while UE 115-*e* and base station 105-*d* are shown performing a number of the operations of process flow 700, any wireless device may perform the operations shown.

At 705, UE 115-*e* may receive, from base station 105-*d*, a configuration for UE 115-*e* to operate on a first carrier using a first RAT (e.g., LTE) and on a second carrier using a second RAT (e.g., NR) different from the first RAT. In some cases, the second RAT may be associated with NR communications.

At 710, UE 115-*e* may determine a symbol configuration for a PUCCH group based on the configuration, the symbol configuration including a length of an sTTI. The symbol configuration may include a first quantity of downlink symbols and a second quantity of uplink symbols.

At 715, UE 115-*e* may configure a timing offset to transmit an uplink message to base station 105-*d* based on the determined symbol configuration, where the uplink message includes an acknowledgement message, a PUSCH, or an sPUSCH.

At 720, UE 115-*e* may determine a timeline to transmit an uplink signal to base station 105-*d* after receiving a downlink signal from the base station based on the determined symbol configuration and timing offset. Accordingly, UE 115-*e* may determine a timeline related to a downlink/uplink reference configuration based on a first quantity of downlink symbols and a second quantity of uplink symbols within the symbol configuration, where configuring the timing offset is based on an operation associated with the first RAT or an operation associated with an sTTI.

At 725, UE 115-*e* may communicate with base station 105-*d* as part of an SUO using one of the first RAT or the second RAT based on the timing offset. For example, UE 115-*e* may transmit the uplink message in a second slot in a second subframe after the timing offset based on receiving a downlink grant in a subslot of a first slot in a first subframe, where the uplink message includes an acknowledgement message. Additionally, UE 115-*e* may transmit the uplink message in the second slot in the second subframe after the timing offset based on receiving an uplink grant in a subslot of the first slot in the first subframe, where the uplink message includes a shortened uplink message (e.g., sPUSCH). Additionally or alternatively, UE 115-*e* may transmit the uplink message in a second subframe after the timing offset based on receiving a downlink grant in a first subframe and/or may transmit the uplink message in a sTTI in the second subframe after the timing offset based on receiving the downlink grant in an sTTI in the first subframe, where the uplink message includes an acknowledgement message for both cases.

Figure 8:
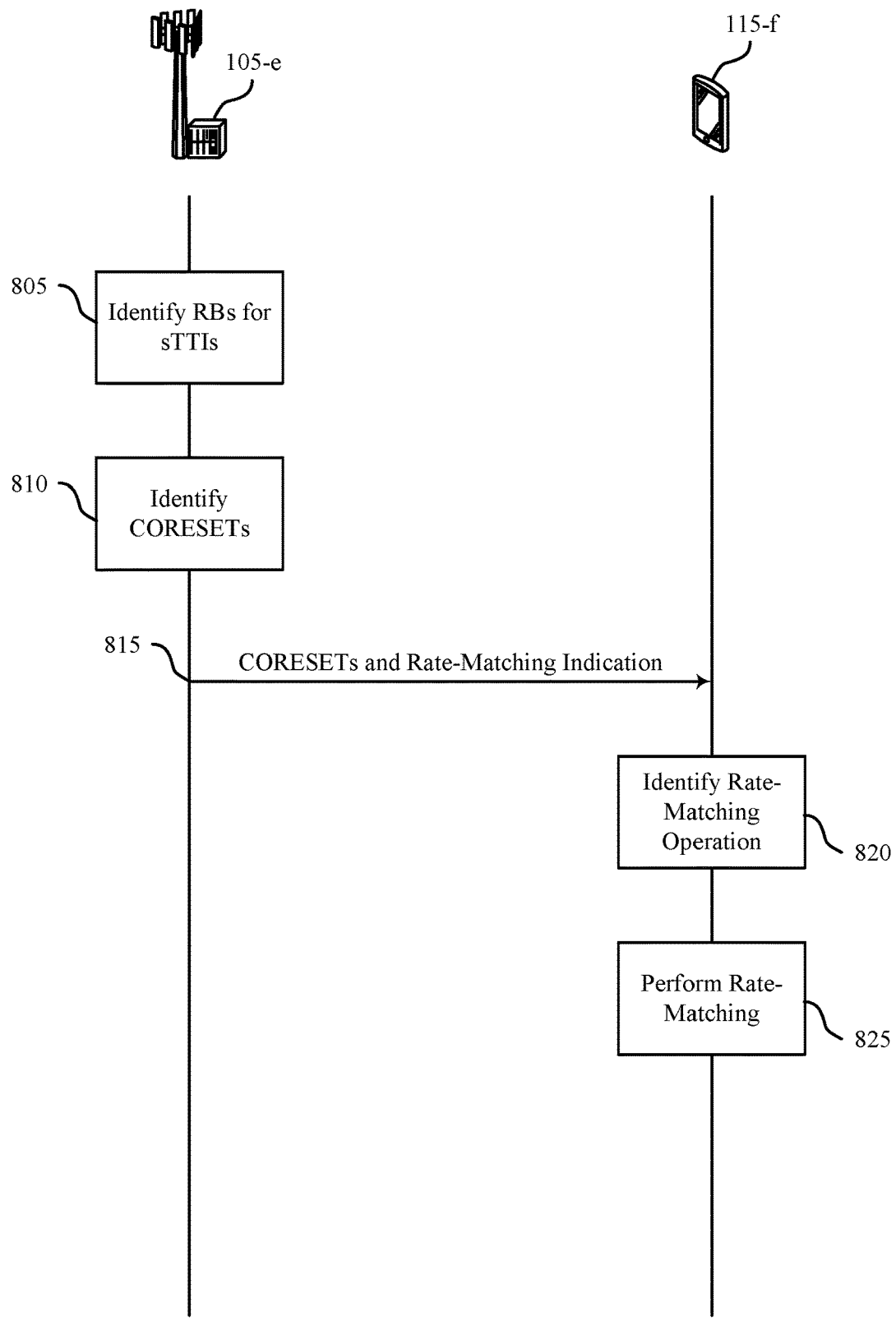

FIG. 8 illustrates an example of a process flow 800 that supports TTI integration for multiple RATs in accordance with aspects of the present disclosure. In some examples, process flow 800 may implement aspects of wireless communications systems 100 and/or 200. Process flow 800 may include a base station 105-*e* and a UE 115-*f*, which may be examples of corresponding base stations 105 and UEs 115, respectively, as described above with reference to FIGS. 1-7.

In the following description of the process flow 800, the operations between UE 115-*f* and base station 105-*e* may be performed in different orders or at different times. Certain operations may also be left out of the process flow 800, or other operations may be added to the process flow 600. It is to be understood that while UE 115-*f* and base station 105-*e* are shown performing a number of the operations of process flow 800, any wireless device may perform the operations shown.

At 805, base station 105-*e* may identify one or more sets of RBs for a TTI associated with a first RAT (e.g., LTE) to be transmitted to UE 115-*f*, the TTI associated with the first RAT including an sTTI.

At 810, base station 105-*e* may identify one or more CORESETs to be transmitted to UE 115-*f* using a TTI using a second RAT (e.g., NR). In some cases, the second RAT may be associated with NR communications. Accordingly, base station 105-*e* may determine that the one or more sets of RBs for the sTTI are within at least one of the one or more CORESETs of the TTI associated with the second RAT, the one of the one or more CORESETs relating to PDSCH processing.

At 815, base station 105-*e* may transmit, to UE 115-*f*, an indication to perform a rate-matching operation during a portion of the PDSCH processing associated with the second RAT on the one or more sets of RBs for the sTTI being within the at least one of the one or more CORESETs of the TTI associated with the second RAT. In some cases, one of the one or more CORESETs including the indication to perform the rate-matching operation may be configured semi-statically or dynamically.

At 820, UE 115-*f* may identify the indication, in the CORESET of the one or more CORESETs, to rate match during a portion of PDSCH processing associated with the second RAT when the PDSCH overlaps with RBs for the sTTI of the second RAT different from the first RAT. In some cases, UE 115-*f* may identify the indication to rate match during the portion of PDSCH processing in a subset of one or more CORESETs. Additionally, one of the one or more CORESETs including the indication to perform the rate-matching operation may be configured with a monitoring periodicity associated with a control channel of the sTTI.

At 825, UE 115-*f* may perform a rate-matching operation on the PDSCH based on the indication to rate match during the portion of PDSCH processing. In some cases, the rate-matching operation may be based on a preconfigured behavior for the PDSCH overlapping the one or more sets of RBs for the TTI. Additionally, UE 115-*f* may map different types of uplink data to respective resource elements in an uplink message as part of the rate-matching operation.

Figure 9:
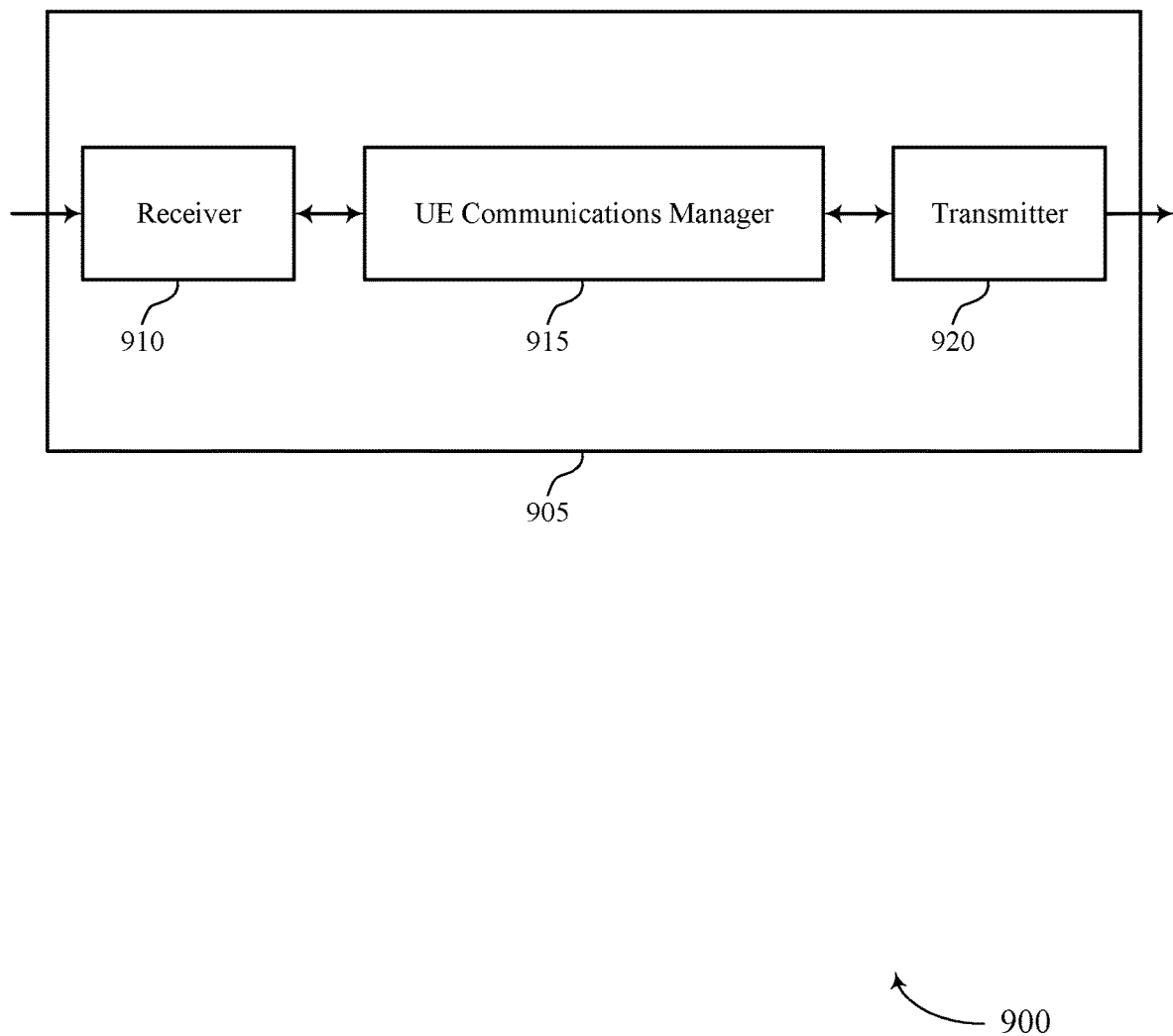
FIGS. 9 and 10 show block diagrams of devices that support TTI integration for multiple RATs in accordance with aspects of the present disclosure.

FIG. 9 shows a block diagram 900 of a device 905 that supports TTI integration for multiple RATs in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transmission time interval integration for multiple radio access technologies, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive, from a base station, a configuration of sTTIs in a subframe using a first RAT, the configuration indicating control format indicator information for the UE. Accordingly, the UE communications manager 915 may communicate with the base station over TTIs using a second RAT different from the first RAT based on the configuration.

Additionally or alternatively, the UE communications manager 915 may also receive, from the base station, a configuration for the UE to operate on a first carrier using the first RAT and on a second carrier using the second RAT different from the first RAT. The UE communications manager 915 may then determine a symbol configuration for a PUCCH group based on the configuration, the symbol configuration including a length of an sTTI and configure a timing offset for the UE to transmit an uplink message to the base station based on the determined symbol configuration. Subsequently, the UE communications manager 915 may communicate with the base station as part of an SUO using one of the first RAT or the second RAT based on the timing offset.

Additionally or alternatively, the UE communications manager 915 may also receive, from the base station, one or more CORESETs for a TTI using the second RAT. Accordingly, in some cases, the UE communications manager 915 may identify an indication, in a CORESET of the one or more CORESETs, to rate match during a portion of PDSCH processing associated with the second RAT when the PDSCH overlaps with RBs for an sTTI of the first RAT different from the second RAT. Accordingly, the UE communications manager 915 may perform a rate-matching operation on the PDSCH based on the indication to rate match during the portion of PDSCH processing. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
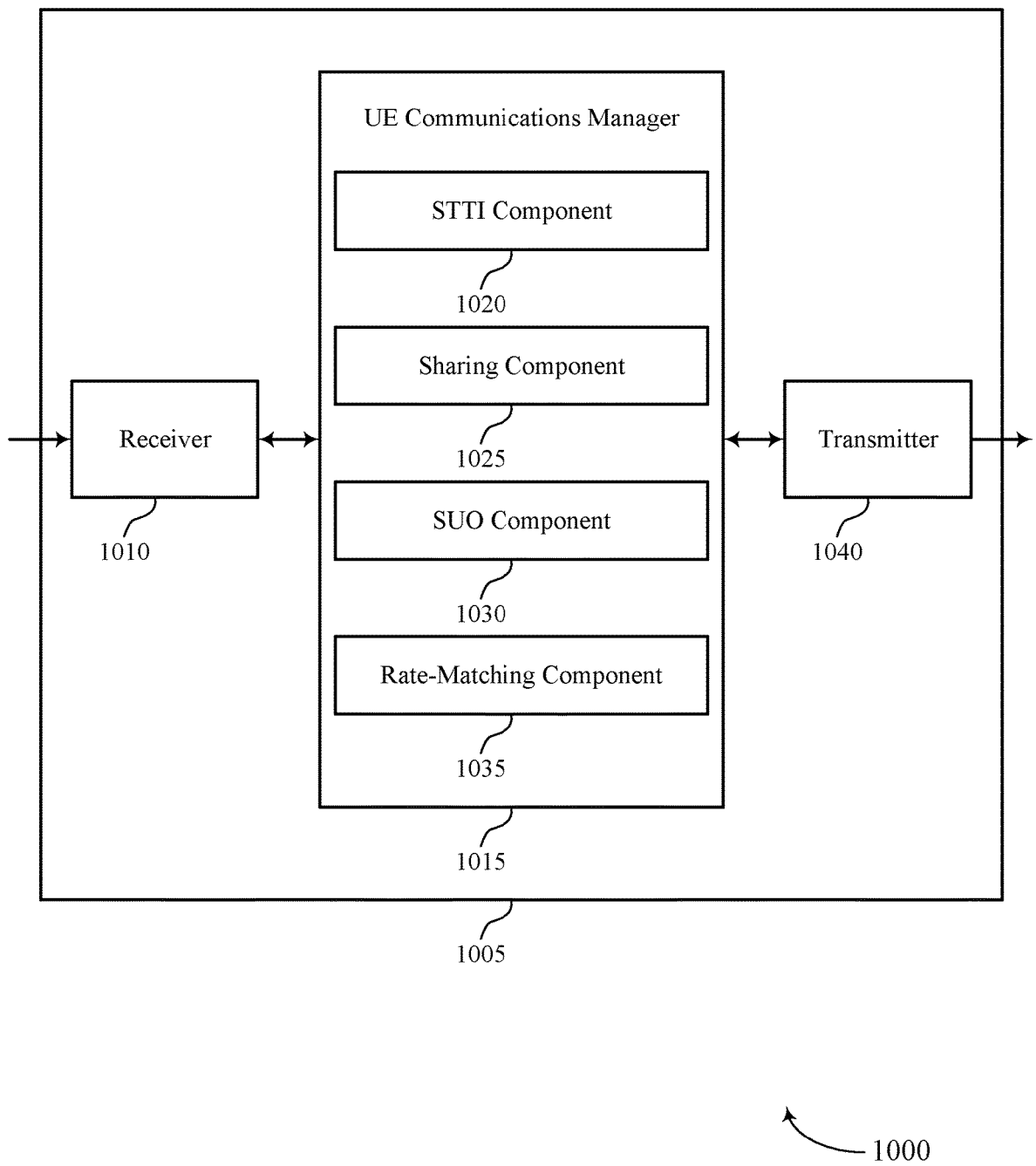

FIG. 10 shows a block diagram 1000 of a device 1005 that supports TTI integration for multiple RATs in accordance with aspects of the present disclosure. The device 1005 may be an example of aspects of a device 905 or a UE 115 as described herein. The device 1005 may include a receiver 1010, a UE communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to transmission time interval integration for multiple radio access technologies, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a sTTI component 1020, a sharing component 1025, a SUO component 1030, and a rate-matching component 1035. The UE communications manager 1015 may be an example of aspects of the UE communications manager 1210 described herein.

The sTTI component 1020 may receive, from a base station, a configuration of sTTIs in a subframe using a first RAT, the configuration indicating control format indicator information for the UE.

The sharing component 1025 may communicate with the base station over TTIs using a second RAT different from the first RAT based on the configuration.

The SUO component 1030 may receive, from a base station, a configuration for the UE to operate on a first carrier using a first RAT and on a second carrier using a second RAT different from the first RAT, determine a symbol configuration for a PUCCH group based on the configuration, the symbol configuration including a length of a sTTI. The SUO component 1030 may then configure a timing offset for the UE to transmit an uplink message to the base station based on the determined symbol configuration and communicate with the base station as part of an SUO using one of the first RAT or the second RAT based on the timing offset.

The rate-matching component 1035 may receive, from a base station, one or more CORESETs for a TTI using a second RAT. In some cases, the rate-matching component 1035 may then identify an indication, in a CORESET of the one or more CORESETs, to rate match during a portion of PDSCH processing associated with the second RAT when the PDSCH overlaps with RBs for an sTTI of a first RAT different from the second RAT. Accordingly, the rate-matching component 1035 may perform a rate-matching operation on the PDSCH based on the indication to rate match during the portion of PDSCH processing.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
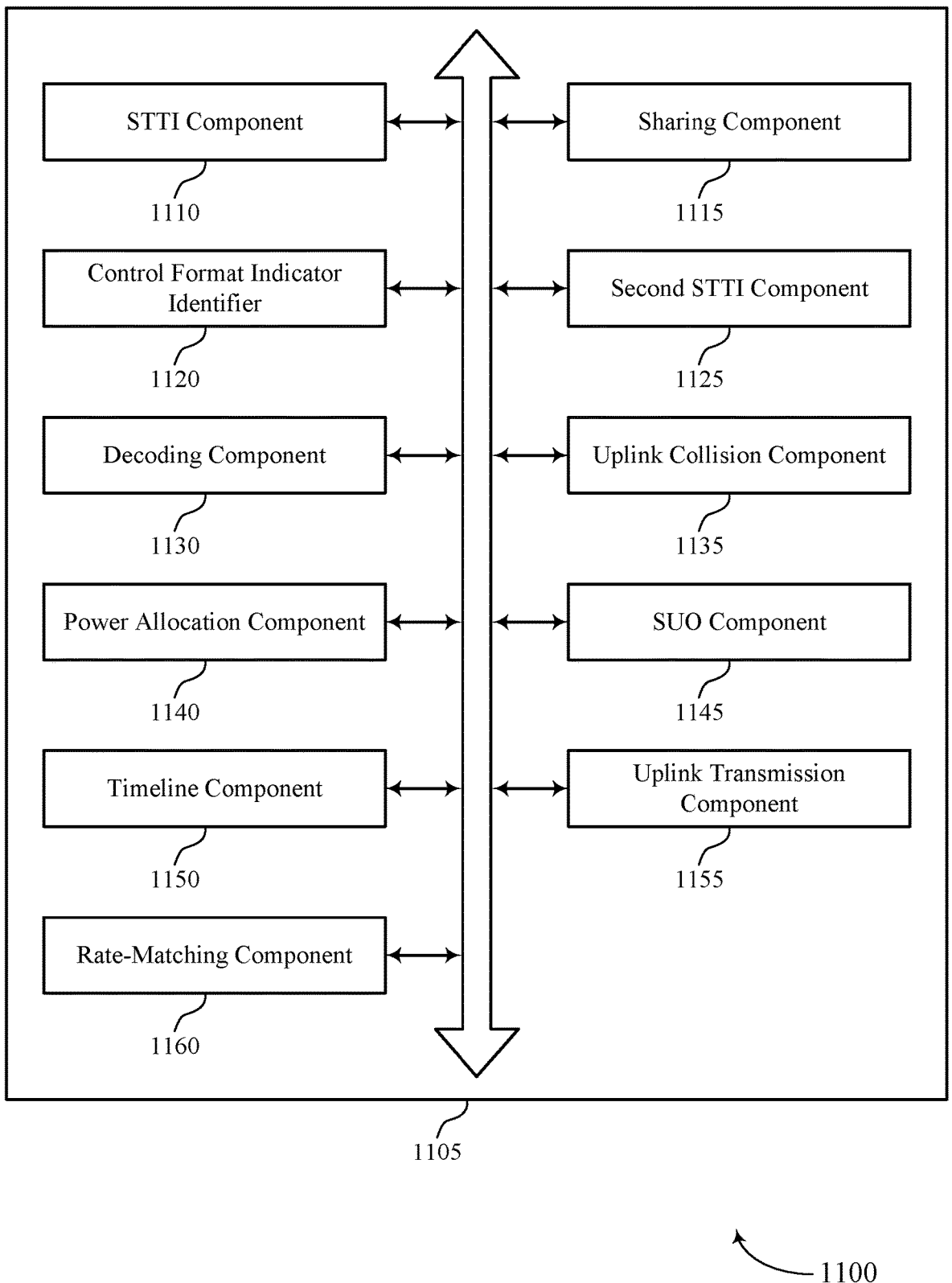
FIG. 11 shows a block diagram of a UE communications manager that supports TTI integration for multiple RATs in accordance with aspects of the present disclosure.

FIG. 11 shows a block diagram 1100 of a UE communications manager 1105 that supports TTI integration for multiple RATs in accordance with aspects of the present disclosure. The UE communications manager 1105 may be an example of aspects of a UE communications manager 915, a UE communications manager 1015, or a UE communications manager 1210 described herein. The UE communications manager 1105 may include a sTTI component 1110, a sharing component 1115, a control format indicator identifier 1120, a second sTTI component 1125, a decoding component 1130, an uplink collision component 1135, a power allocation component 1140, a SUO component 1145, a timeline component 1150, an uplink transmission component 1155, and a rate-matching component 1160. Each of these modules may communicate, directly or indirectly, with one another (e.g., via one or more buses).

The sTTI component 1110 may receive, from a base station, a configuration of sTTIs in a subframe using a first RAT, the configuration indicating control format indicator information for the UE.

The sharing component 1115 may communicate with the base station over TTIs using a second RAT different from the first RAT based on the configuration. In some cases, the second RAT is associated with NR communications. In some cases, an end of a TTI of the TTIs of the second RAT may be aligned with an end of an sTTI of sTTIs of the first RAT. Additionally or alternatively, a boundary of each TTI of the TTIs of the second RAT may be aligned with a boundary of a respective sTTI of the sTTIs of the first RAT such that each TTI of the TTIs of the second RAT spans a length less than or equal a length of a respective sTTI of the sTTIs of the first RAT. Additionally or alternatively, a TTI of the TTIs of the second RAT may span a single sTTI boundary between two sTTIs of the first RAT. In some cases, the sTTIs of the first RAT may be each confined within a slot of the subframe. In some cases, a configuration of the TTIs is a configuration for an MBSFN subframe or a configuration for a non-MBSFN subframe.

The SUO component 1145 may receive, from a base station, a configuration for the UE to operate on a first carrier using a first RAT and on a second carrier using a second RAT different from the first RAT. In some examples, the SUO component 1145 may determine a symbol configuration for a PUCCH group based on the configuration, the symbol configuration including a length of an sTTI. Subsequently, the SUO component 1145 may then configure a timing offset for the UE to transmit an uplink message to the base station based on the determined symbol configuration. Accordingly, the SUO component 1145 may communicate with the base station as part of a SUO using one of the first RAT or the second RAT based on the timing offset. In some cases, the symbol configuration may include a first quantity of downlink symbols and a second quantity of uplink symbols.

The rate-matching component 1160 may receive, from a base station, one or more CORESETs for a TTI using a second RAT. In some examples, the rate-matching component 1160 may identify an indication, in a CORESET of the one or more CORESETs, to rate match during a portion of PDSCH processing associated with the second RAT when the PDSCH overlaps with RBs for an sTTI of a first RAT different from the second RAT. Accordingly, the rate-matching component 1160 may perform a rate-matching operation on the PDSCH based on the indication to rate match during the portion of PDSCH processing. In some examples, the rate-matching component 1160 may identify the indication to rate match during the portion of PDSCH processing in a subset of one or more CORESETs. Additionally, the rate-matching component 1160 may map different types of uplink data to respective resource elements in an uplink message as part of the rate-matching operation.

In some cases, the rate-matching operation may be based on a preconfigured behavior for the PDSCH overlapping the one or more sets of RBs for the TTI. Additionally, one of the one or more CORESETs including the indication to perform the rate-matching operation may be configured semi-statically or dynamically. In some cases, one of the one or more CORESETs including the indication to perform the rate-matching operation may be configured with a monitoring periodicity associated with a control channel of the sTTI.

The control format indicator identifier 1120 may identify, based on the configuration, a control format indicator value of the control format indicator information in a shared CC, where communicating with the base station over TTIs using the second RAT different from the first RAT is based on identifying the control format indicator value. In some examples, the control format indicator identifier 1120 may identify, based on the configuration, a control format indicator value from the control format indicator information in at least one symbol in a set of symbols at the beginning of the subframe, where communicating with the base station is based on identifying the control format indicator value. In some cases, the set of symbols is three symbols and the at least one symbol is the three symbols. Additionally or alternatively, the control format indicator identifier 1120 may identify, based on the configuration, a control format indicator value of the control format indicator information by decoding a PCFICH, where communicating with the base station is based on the control format indicator value.

In some cases, the control format indicator information is configured semi-statically. Accordingly, the control format indicator identifier 1120 may determine whether the control format indicator value of the control format indicator information is greater than a semi-static indication associated with the control format indicator information, where communicating with the base station over TTIs using the second RAT different from the first RAT is based on whether the control format indicator value of the control format indicator information is greater than the semi-static indication associated with the control format indicator information.

The second sTTI component 1125 may receive, from the base station, a second configuration of sTTIs in a subframe for the first RAT. In some examples, the second sTTI component 1125 may identify, based on the second configuration, a control format indicator value from the control format indicator information by decoding a PCFICH or based on a semi-static indication associated with the control format indicator information, where communicating with the base station is based on the control format indicator value. In some cases, the second configuration of sTTIs is a configuration for an MBSFN subframe or a configuration for a non-MBSFN subframe.

The decoding component 1130 may receive, from the base station using the first RAT, an sTTI including a first downlink channel for the first RAT and may receive, from the base station using the second RAT, a TTI including a second downlink channel for the second RAT. In some examples, the decoding component 1130 may determine a capability of the UE to decode the first downlink channel for the first RAT and the second downlink channel for the second RAT within an operation constraint. Accordingly, in some examples, the decoding component 1130 may refrain from decoding one of the first downlink channel for the first RAT and the second downlink channel for the second RAT based on the determined capability. In some cases, the operation constraint includes a timing constraint for the UE, a power constraint for the UE, a bandwidth constraint for the UE, or an enhanced downlink channel is supported by the first RAT, or a combination thereof.

In some cases, the decoding component 1130 may determine a priority of the first RAT and the second RAT, where refraining from decoding one of the first downlink channel for the first RAT and the second downlink channel for the second RAT based on the determined priority. In some examples, the decoding component 1130 may determine the priority based on a total processing time for the UE to decide the first downlink channel and the second downlink channel, or a timing of reception of the sTTI including the first downlink channel and a timing of reception of the TTI including the second downlink channel, the first RAT being associated with LTE and the second RAT being associated with 5G, or a type of traffic for the second RAT being associated with low latency data, or some combination thereof.

Additionally or alternatively, the decoding component 1130 may determine a constraint on a processing time of the first RAT relative to the second RAT, where refraining from decoding one of the first downlink channel for the first RAT or the second downlink channel for the second RAT is based on the constraint on the processing time.

In some cases, the constraint on the processing time includes the first downlink channel for the first RAT or the second downlink channel for the second RAT being in an exclusion window, a number of RBs, a number of CCs, a maximum TBS, a length of a CORESET for the second RAT, a length of an RB set for the first RAT, or a reference signal type used for an sTTI RB set for the first RAT, or a combination thereof. In some examples, the decoding component 1130 may report a size of the exclusion window in a UE capability message, where the size of the exclusion window is based on a capability of the UE to support different length sTTIs for the first RAT and the configuration of sTTIs, different length TTIs for the second RAT, or both.

The uplink collision component 1135 may identify a collision of a first uplink message for the first RAT and a second uplink message for the second RAT. In some examples, the uplink collision component 1135 may determine a priority of the first uplink message or the second uplink message, where the priority is based on the first RAT and the second RAT, an alignment of a starting boundary for the first uplink message and the second uplink message, the timing of when downlink grants for the first uplink message and the second uplink message are received, a UE capability, a gap between starting boundaries between the first uplink message and the second uplink message, or a combination thereof. Accordingly, the uplink collision component 1135 may transmit one of the first uplink message for the first RAT or the second uplink message for the second RAT based on the determined priority, where at least a portion of UCI for the first uplink message or the second uplink message is transmitted with the other of the first or second uplink message.

The power allocation component 1140 may allocate a first power for a transmission on one TTI of the TTIs of the second RAT. Additionally, the power allocation component 1140 may allocate a second power different from the first power for a transmission on one sTTI of the sTTIs of the first RAT. In some cases, one of the first power or the second power includes a maximum power or a minimum power for the UE.

The timeline component 1150 may determine a timeline for the UE to transmit an uplink signal to the base station after receiving a downlink signal from the base station based on the determined symbol configuration. In some examples, the timeline component 1150 may determine a timeline related to a downlink/uplink reference configuration based on a first quantity of downlink symbols and a second quantity of uplink symbols within the symbol configuration, where configuring the timing offset is based on an operation associated with the first RAT or an operation associated with an sTTI. The uplink transmission component 1155 may then transmit the uplink message in a second slot in a second subframe after the timing offset based on receiving a downlink grant in a subslot of a first slot in a first subframe, where the uplink message includes an acknowledgement message.

In some examples, the uplink transmission component 1155 may transmit the uplink message in the second slot in the second subframe after the timing offset based on receiving an uplink grant in a subslot of the first slot in the first subframe, where the uplink message includes a shortened uplink message (e.g., sPUSCH). Additionally, the uplink transmission component 1155 may transmit the uplink message in a second subframe after the timing offset based on receiving a downlink grant in a first subframe, where the uplink message comprises an acknowledgment message. Additionally or alternatively, the uplink transmission component 1155 may transmit the uplink message in an sTTI in the second subframe after the timing offset based on receiving the downlink grant in an sTTI in the first subframe, where the uplink message comprises an acknowledgment message.

Figure 12:
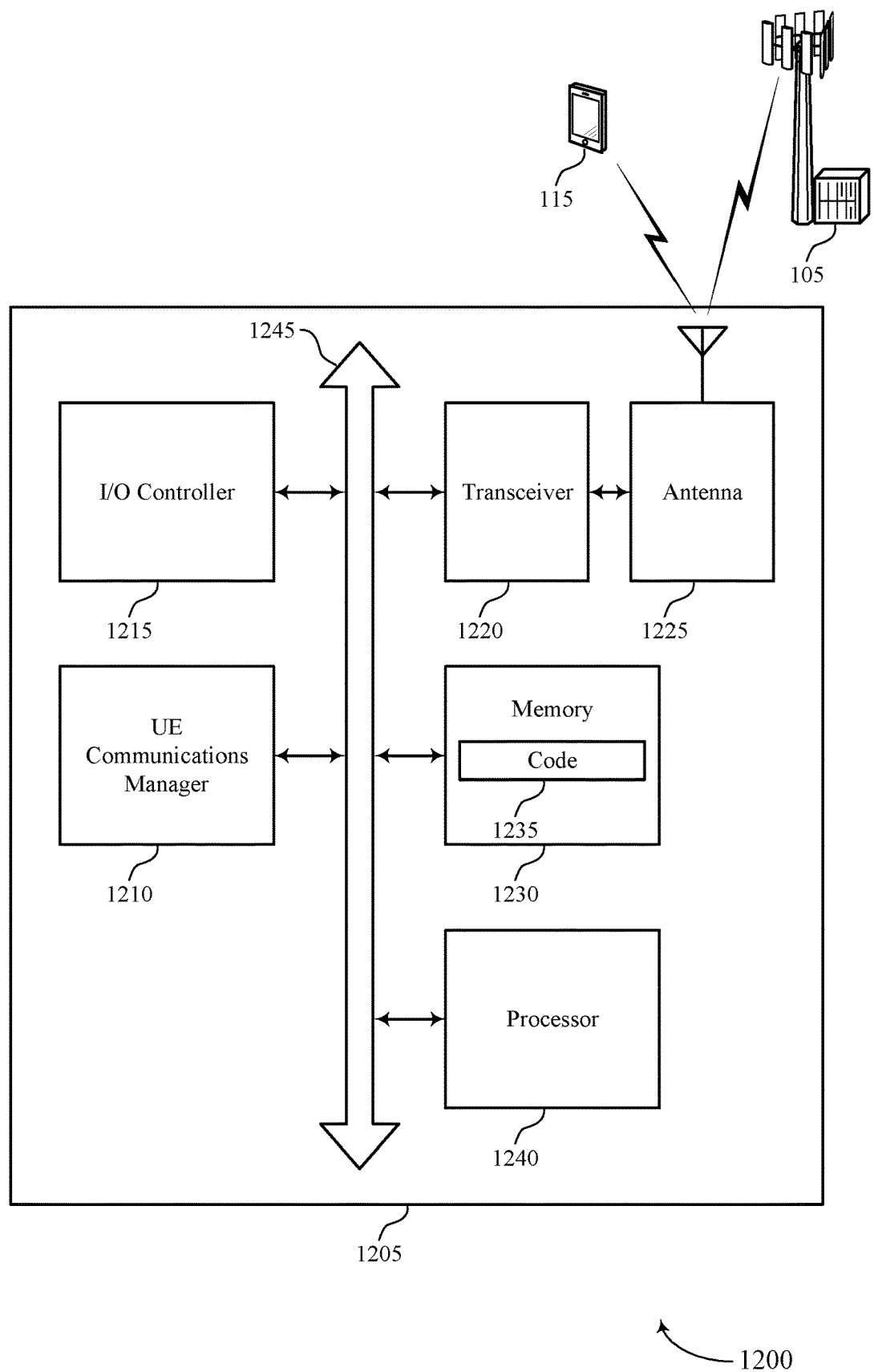
FIG. 12 shows a diagram of a system including a device that supports TTI integration for multiple RATs in accordance with aspects of the present disclosure.

FIG. 12 shows a diagram of a system 1200 including a device 1205 that supports TTI integration for multiple RATs in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may receive, from a base station, a configuration of sTTIs in a subframe using a first RAT, the configuration indicating control format indicator information for the UE. Accordingly, the UE communications manager 1210 may communicate with the base station over TTIs using a second RAT different from the first RAT based on the configuration.

Additionally or alternatively, the UE communications manager 1210 may also receive, from the base station, a configuration for the UE to operate on a first carrier using the first RAT and on a second carrier using the second RAT different from the first RAT. The UE communications manager 1210 may then determine a symbol configuration for a PUCCH group based on the configuration, the symbol configuration including a length of an sTTI and configure a timing offset for the UE to transmit an acknowledgement message to the base station based on the determined symbol configuration. Subsequently, the UE communications manager 1210 may communicate with the base station as part of an SUO using one of the first RAT or the second RAT based on the timing offset.

Additionally or alternatively, the UE communications manager 1210 may also receive, from the base station, one or more CORESETs for a TTI using the second RAT. Accordingly, in some cases, the UE communications manager 1210 may identify an indication, in a CORESET of the one or more CORESETs, to rate match during a portion of PDSCH processing associated with the second RAT when the PDSCH overlaps with RBs for an sTTI of the first RAT different from the second RAT. Accordingly, the UE communications manager 1210 may perform a rate-matching operation on the PDSCH based on the indication to rate match during the portion of PDSCH processing.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting transmission time interval integration for multiple radio access technologies).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
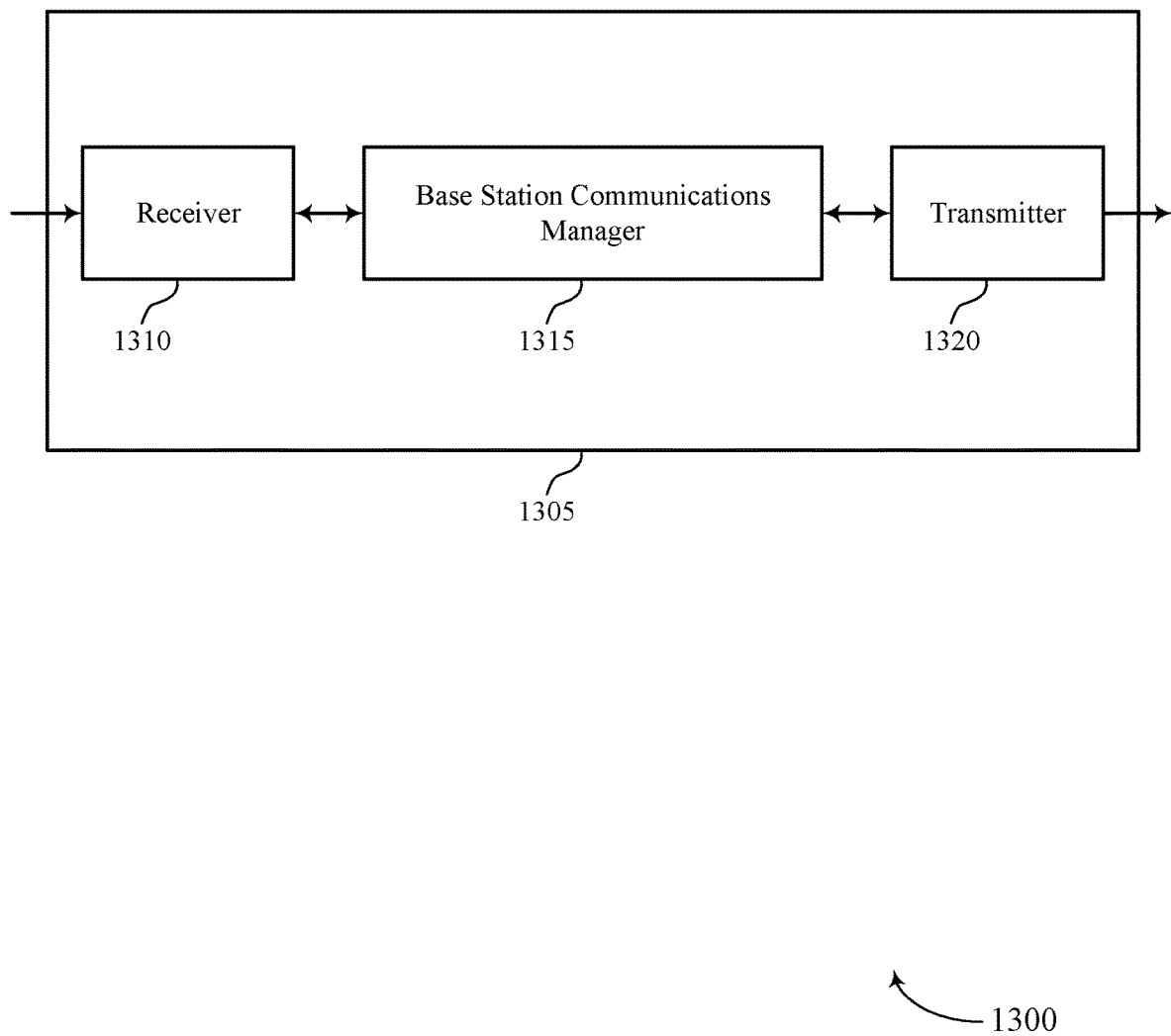
FIGS. 13 and 14 show block diagrams of devices that support TTI integration for multiple RATs in accordance with aspects of the present disclosure.

FIG. 13 shows a block diagram 1300 of a device 1305 that supports TTI integration for multiple RATs in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to transmission time interval integration for multiple radio access technologies, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit, to a UE, a configuration of sTTIs in a subframe using a first RAT, the configuration indicating control format indicator information for the UE. The base station communications manager 1315 may then communicate with the UE over TTIs associated a second RAT different from the first RAT based on the configuration.

Additionally or alternatively, the base station communications manager 1315 may also identify one or more sets of RBs for a TTI associated with the first RAT to be transmitted to the UE, the TTI associated with the first RAT including an sTTI. The base station communications manager 1315 may then identify one or more CORESETs to be transmitted to the UE using a TTI using a second RAT. Accordingly, the base station communications manager 1315 may determine that the one or more sets of RBs for the sTTI are within at least one of the one or more CORESETs of the TTI associated with the second RAT, the one of the one or more CORESETs relating to PDSCH processing. Subsequently, the base station communications manager 1315 may transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
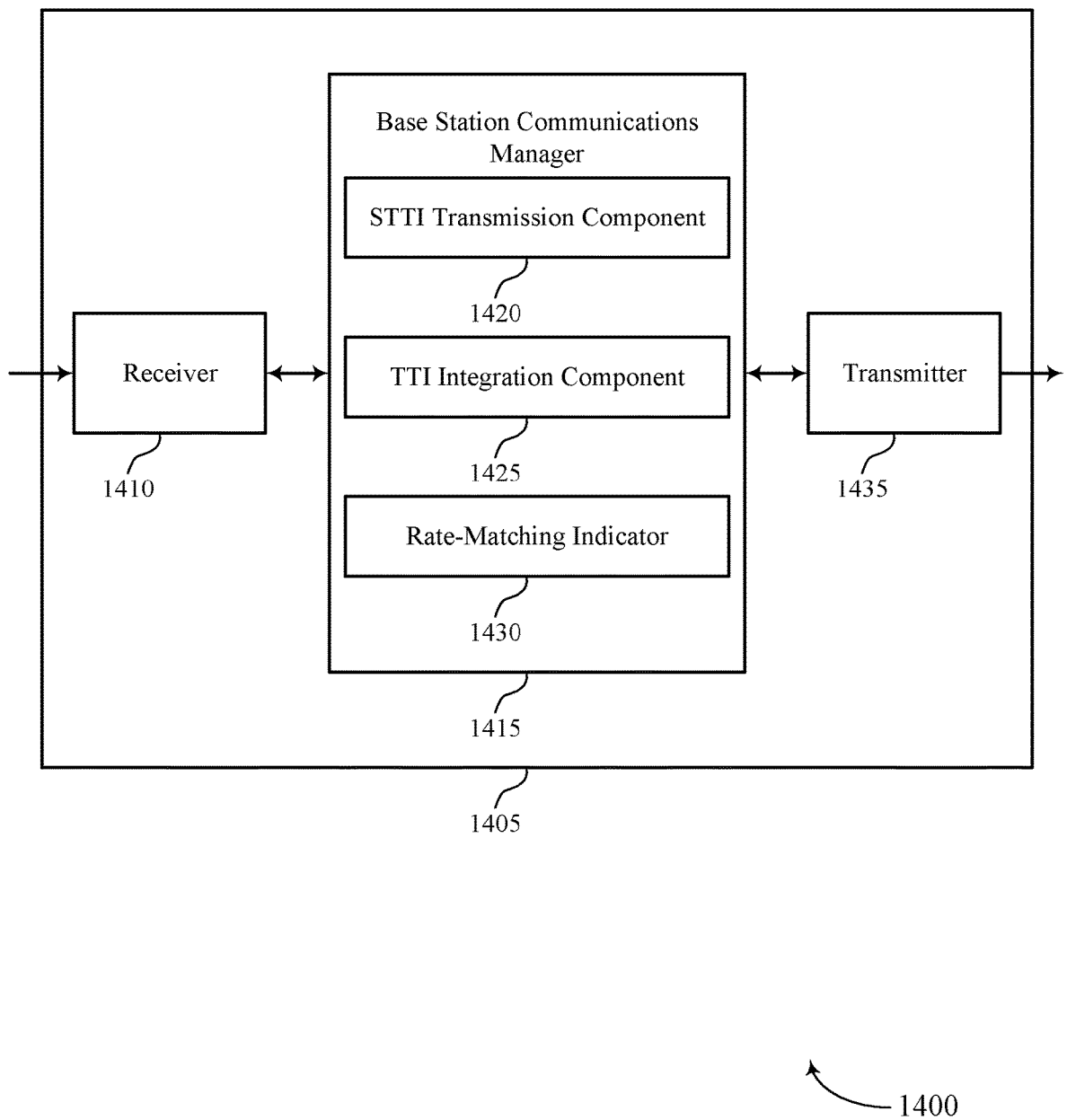

FIG. 14 shows a block diagram 1400 of a device 1405 that supports TTI integration for multiple RATs in accordance with aspects of the present disclosure. The device 1405 may be an example of aspects of a device 1305 or a base station 105 as described herein. The device 1405 may include a receiver 1410, a base station communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to transmission time interval integration for multiple radio access technologies, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a sTTI transmission component 1420, a TTI integration component 1425, and a rate-matching indicator 1430. The base station communications manager 1415 may be an example of aspects of the base station communications manager 1610 described herein.

The sTTI transmission component 1420 may transmit, to a UE, a configuration of sTTIs in a subframe using a first RAT, the configuration indicating control format indicator information for the UE.

The TTI integration component 1425 may communicate with the UE over TTIs associated a second RAT different from the first RAT based on the configuration.

The rate-matching indicator 1430 may identify one or more sets of RBs for a TTI associated with the first RAT to be transmitted to the UE, the TTI associated with the first RAT including an sTTI and may identify one or more CORESETs to be transmitted to the UE using a TTI using the second RAT. In some cases, the rate-matching indicator 1430 may then determine that the one or more sets of RBs for the sTTI are within at least one of the one or more CORESETs of the TTI associated with the second RAT, the one of the one or more CORESETs relating to PDSCH processing. Accordingly, the rate-matching indicator 1430 may transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
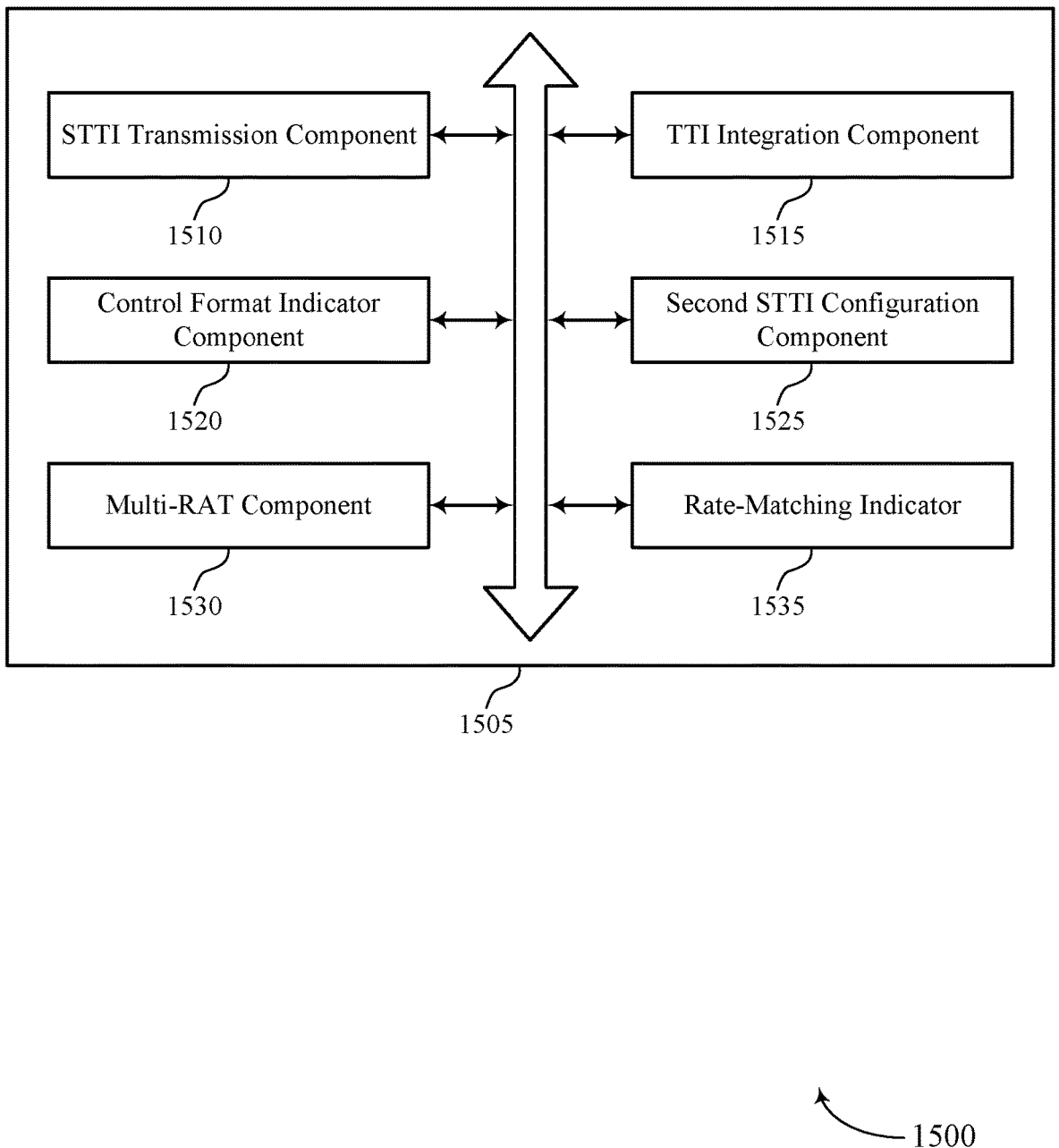
FIG. 15 shows a block diagram of a base station communications manager that supports TTI integration for multiple RATs in accordance with aspects of the present disclosure.

FIG. 15 shows a block diagram 1500 of a base station communications manager 1505 that supports TTI integration for multiple RATs in accordance with aspects of the present disclosure. The base station communications manager 1505 may be an example of aspects of a base station communications manager 1315, a base station communications manager 1415, or a base station communications manager 1610 described herein. The base station communications manager 1505 may include a sTTI transmission component 1510, a TTI integration component 1515, a control format indicator component 1520, a second sTTI configuration component 1525, a multi-RAT component 1530, and a rate-matching indicator 1535. Each of these modules may communicate, directly or indirectly, with one another (e.g., via one or more buses).

The sTTI transmission component 1510 may transmit, to a UE, a configuration of sTTIs in a subframe using a first RAT, the configuration indicating control format indicator information for the UE.

The TTI integration component 1515 may communicate with the UE over TTIs associated a second RAT different from the first RAT based on the configuration. In some cases, the second RAT is associated with new radio communications. In some cases, a configuration of the TTIs is a configuration for an MBSFN subframe or a configuration for a non-MBSFN subframe.

In some examples, the TTI integration component 1515 may transmit one or more sTTIs over the first RAT such that an end of a TTI of the TTIs of the second RAT is aligned with an end of an sTTI of sTTIs of the first RAT. Additionally or alternatively, the TTI integration component 1515 may transmit one or more sTTIs over the first RAT such that a boundary of each TTI of the TTIs of the second RAT is aligned with a boundary of a respective sTTI of the sTTIs of the first RAT, where each TTI of the TTIs of the second RAT spans a length less than or equal a length of a respective sTTI of sTTIs of the first RAT. In some examples, the TTI integration component 1515 may transmit one or more sTTIs over the first RAT such that a TTI of the TTIs of the second RAT spans an sTTI boundary of two sTTIs of the first RAT. In some examples, the TTI integration component 1515 may TTIs of the first RAT are each confined within a slot of the subframe.

The rate-matching indicator 1535 may identify one or more sets of RBs for a TTI associated with the first RAT to be transmitted to the UE, the TTI associated with the first RAT including an sTTI. Additionally, the rate-matching indicator 1535 may also identify one or more CORESETs to be transmitted to the UE using a TTI using the second RAT. In some examples, the rate-matching indicator 1535 may determine that the one or more sets of RBs for the sTTI are within at least one of the one or more CORESETs of the TTI associated with the second RAT, the one of the one or more CORESETs relating to PDSCH processing. Consequently, the rate-matching indicator 1535 may transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

In some cases, the rate-matching operation may be based on a preconfigured behavior for when the one or more sets of RBs for the sTTI are within the at least one of the one or more CORESETs of the TTI associated with the second RAT. Additionally, the rate-matching operation includes mapping different types of data to respective resource elements in an uplink message. In some cases, one of the one or more CORESETs including the indication to perform the rate-matching operation may be configured semi-statically or dynamically.

The control format indicator component 1520 may indicate, based on the configuration, a control format indicator value of the control format indicator information in a shared CC, where communicating with the UE over TTIs using the second RAT different from the first RAT is based on the control format indicator value. Additionally or alternatively, the control format indicator component 1520 may transmit a control format indicator value from the control format indicator information in at least one symbol in a set of symbols at the beginning of the subframe based on the configuration of the sTTIs associated with the first RAT. In some cases, the set of symbols is three symbols and the at least one symbol is the three symbols. In some examples, the control format indicator component 1520 may transmit, based on the configuration, a control format indicator value of the control format indicator information in a PCFICH, where communicating with the UE is based on the control format indicator value. In some cases, the control format indicator information is configured semi-statically.

The second sTTI configuration component 1525 may transmit, to the UE, a second configuration of sTTIs in a subframe for the first RAT. In some examples, the second sTTI configuration component 1525 may transmit, based on the second configuration, a control format indicator value of the control format indicator information in a PCFICH or in a semi-static indication associated with the control format indicator information, where communicating with the UE is based on the control format indicator value. In some cases, the second configuration of sTTIs may be a configuration for an MBSFN subframe or a configuration for a non-MBSFN subframe.

The multi-RAT component 1530 may transmit, to the UE using the first RAT, an sTTI including a first downlink channel for the first RAT. Additionally, the multi-RAT component 1530 may transmit, to the UE using the second RAT, a TTI including a second downlink channel for the second RAT. In some examples, the multi-RAT component 1530 may receive, from the UE, an acknowledgement message for at least one of the first downlink channel or the second downlink channel based on an operation constraint for the UE. Additionally, in some cases, the multi-RAT component 1530 may receive a size of an exclusion window in a UE capability message, where the acknowledgement message is received based on the size of the exclusion window.

Figure 16:
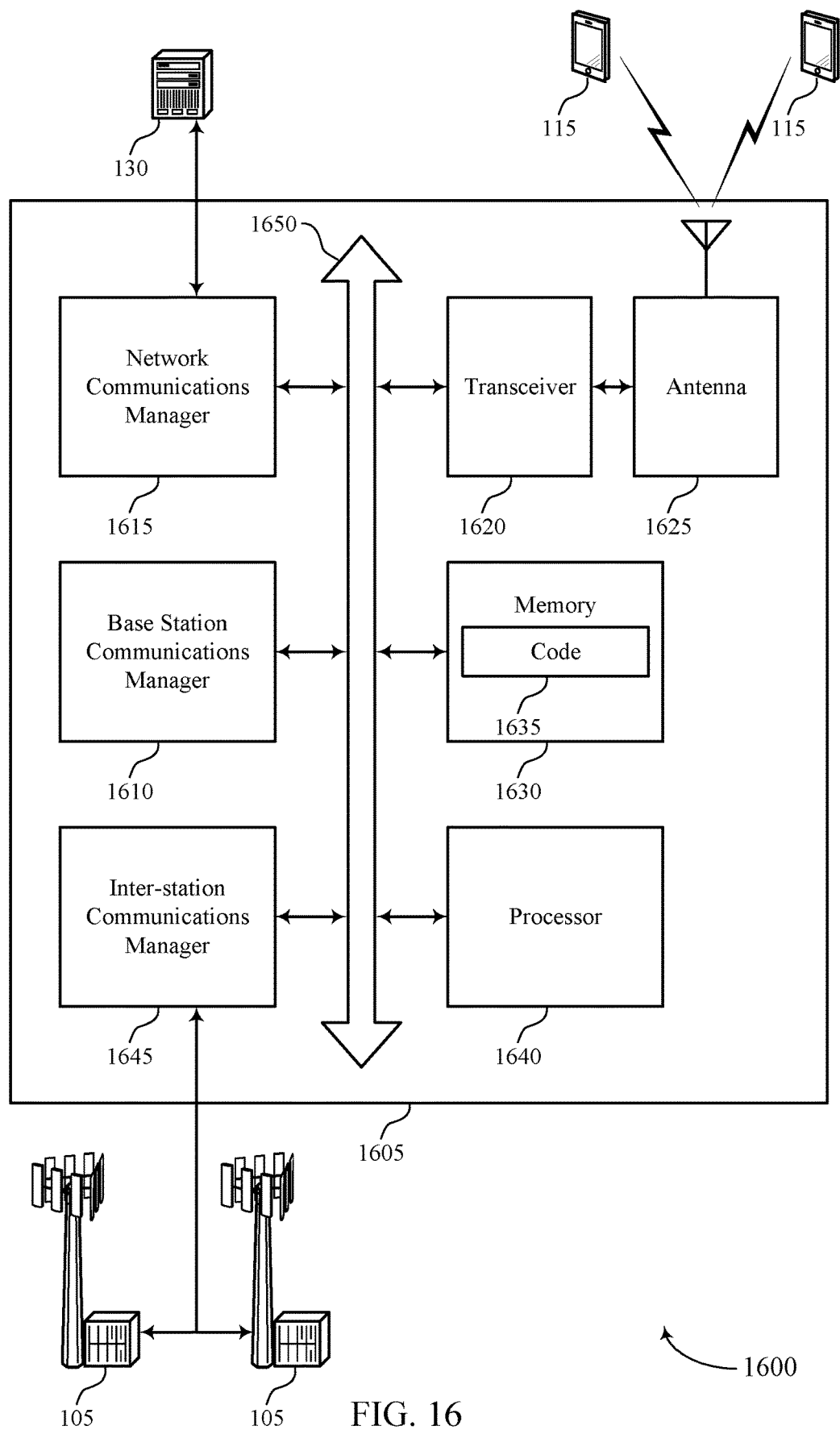
FIG. 16 shows a diagram of a system including a device that supports TTI integration for multiple RATs in accordance with aspects of the present disclosure.

FIG. 16 shows a diagram of a system 1600 including a device 1605 that supports TTI integration for multiple RATs in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may transmit, to a UE, a configuration of sTTIs in a subframe using a first RAT, the configuration indicating control format indicator information for the UE. The base station communications manager 1610 may then communicate with the UE over TTIs associated a second RAT different from the first RAT based on the configuration.

Additionally or alternatively, the base station communications manager 1610 may also identify one or more sets of RBs for a TTI associated with the first RAT to be transmitted to the UE, the TTI associated with the first RAT including an sTTI. The base station communications manager 1610 may then identify one or more CORESETs to be transmitted to the UE using a TTI using a second RAT. Accordingly, the base station communications manager 1610 may determine that the one or more sets of RBs for the sTTI are within at least one of the one or more CORESETs of the TTI associated with the second RAT, the one of the one or more CORESETs relating to PDSCH processing. Subsequently, the base station communications manager 1610 may transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device #{device} to perform various functions (e.g., functions or tasks supporting transmission time interval integration for multiple radio access technologies).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
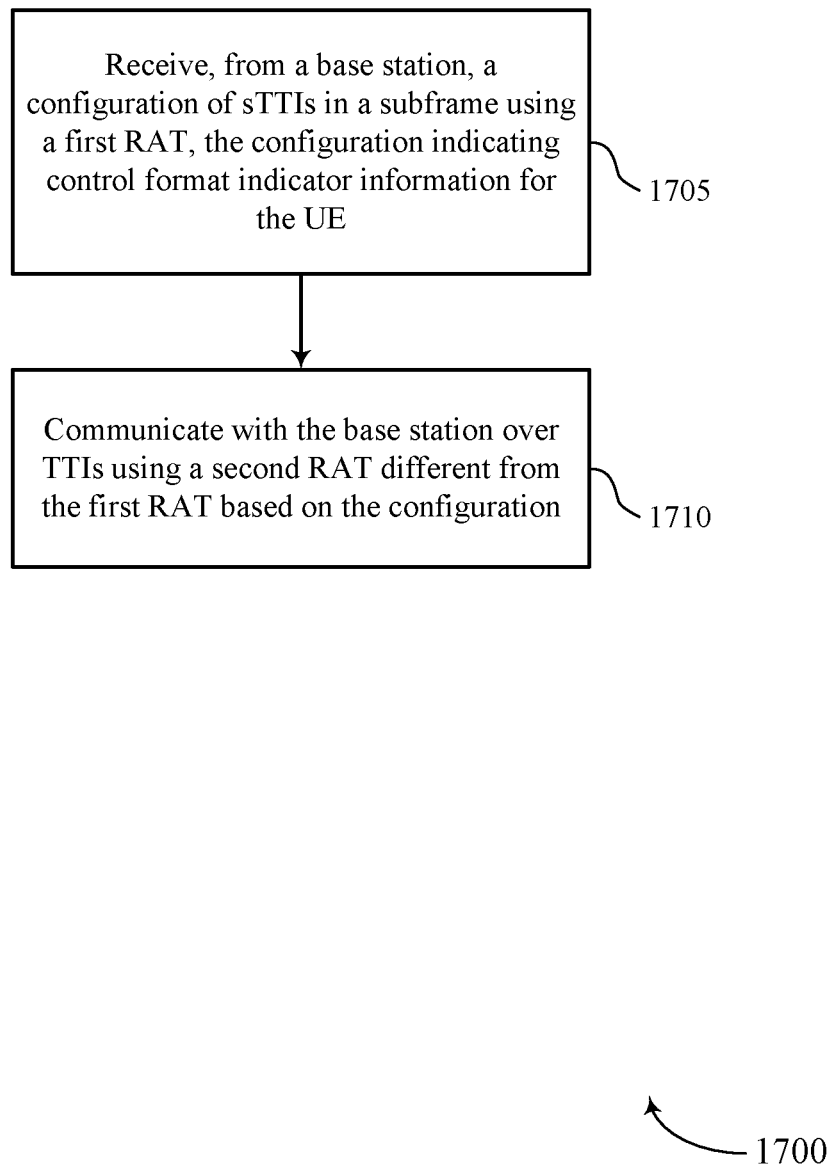
FIGS. 17 through 23 show flowcharts illustrating one or more methods that support TTI integration for multiple RATs in accordance with aspects of the present disclosure.

FIG. 17 shows a flowchart illustrating a method 1700 that supports TTI integration for multiple RATs in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configuration of sTTIs in a subframe using a first RAT, the configuration indicating control format indicator information for the UE. The operations of 1705 may be performed according to the methods described herein. In some examples, aspects of the operations of 1705 may be performed by an sTTI component as described with reference to FIGS. 9 through 12.

At 1710, the UE may communicate with the base station over TTIs using a second RAT different from the first RAT based on the configuration. The operations of 1710 may be performed according to the methods described herein. In some examples, aspects of the operations of 1710 may be performed by a sharing component as described with reference to FIGS. 9 through 12.

Figure 18:
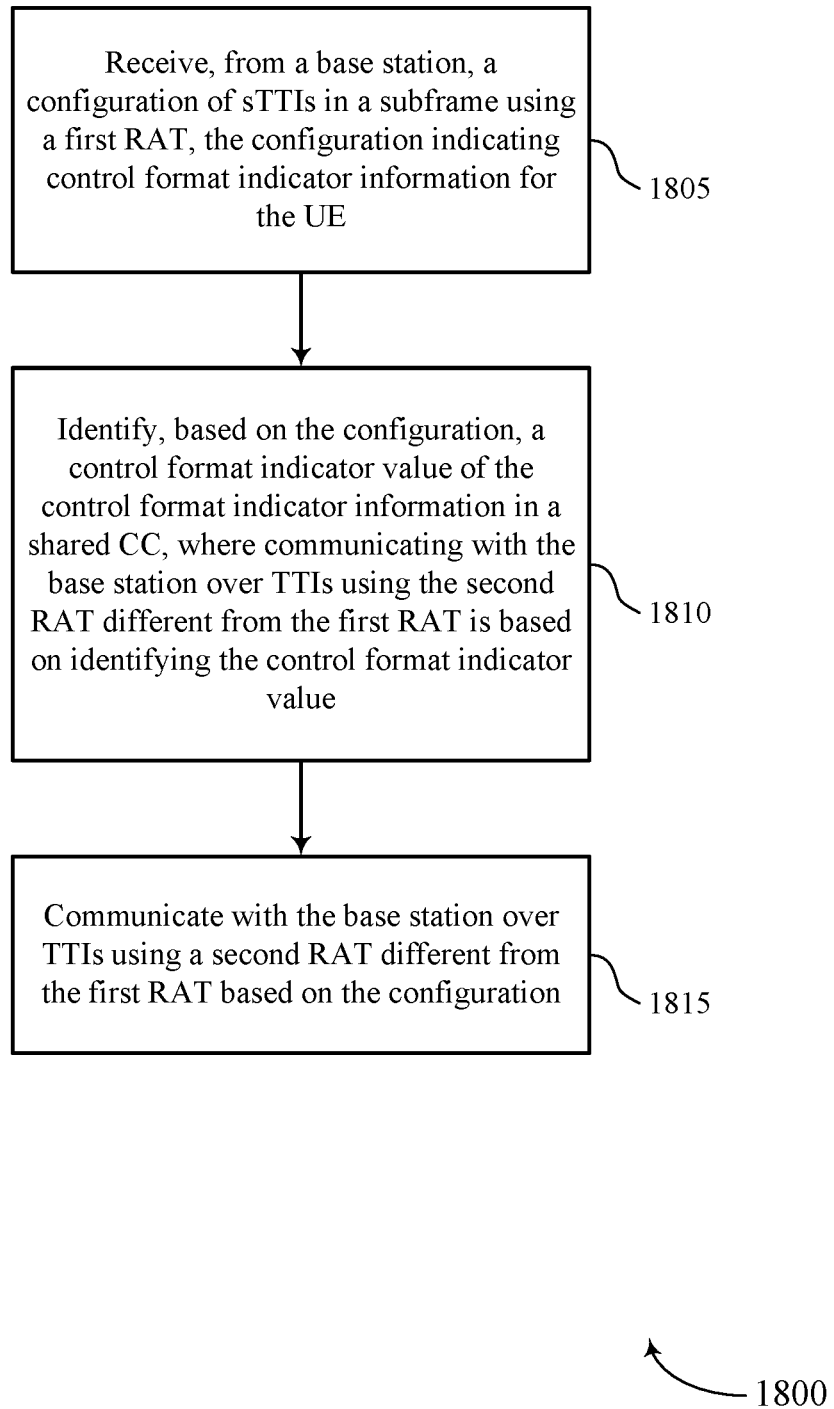

FIG. 18 shows a flowchart illustrating a method 1800 that supports TTI integration for multiple RATs in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a configuration of sTTIs in a subframe using a first RAT, the configuration indicating control format indicator information for the UE. The operations of 1805 may be performed according to the methods described herein. In some examples, aspects of the operations of 1805 may be performed by an sTTI component as described with reference to FIGS. 9 through 12.

At 1810, the UE may identify, based on the configuration, a control format indicator value of the control format indicator information in a shared CC, where communicating with the base station over TTIs using the second RAT different from the first RAT is based on identifying the control format indicator value. The operations of 1810 may be performed according to the methods described herein. In some examples, aspects of the operations of 1810 may be performed by a control format indicator identifier as described with reference to FIGS. 9 through 12.

At 1815, the UE may communicate with the base station over TTIs using a second RAT different from the first RAT based on the configuration. The operations of 1815 may be performed according to the methods described herein. In some examples, aspects of the operations of 1815 may be performed by a sharing component as described with reference to FIGS. 9 through 12.

Figure 19:
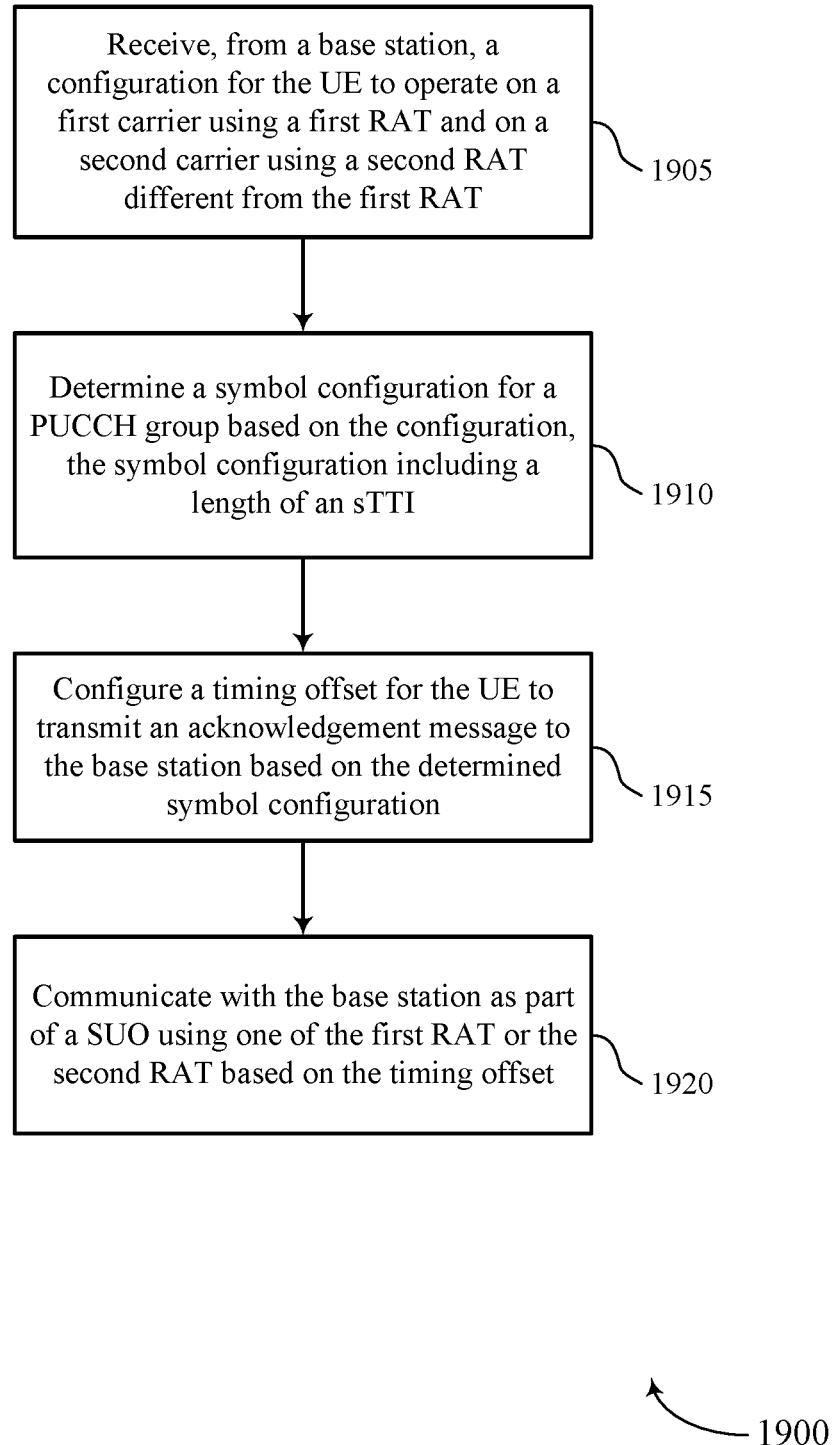

FIG. 19 shows a flowchart illustrating a method 1900 that supports TTI integration for multiple RATs in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration for the UE to operate on a first carrier using a first RAT and on a second carrier using a second RAT different from the first RAT. The operations of 1905 may be performed according to the methods described herein. In some examples, aspects of the operations of 1905 may be performed by an SUO component as described with reference to FIGS. 9 through 12.

At 1910, the UE may determine a symbol configuration for a PUCCH group based on the configuration, the symbol configuration including a length of an sTTI. The operations of 1910 may be performed according to the methods described herein. In some examples, aspects of the operations of 1910 may be performed by an SUO component as described with reference to FIGS. 9 through 12.

At 1915, the UE may configure a timing offset for the UE to transmit an acknowledgement message to the base station based on the determined symbol configuration. The operations of 1915 may be performed according to the methods described herein. In some examples, aspects of the operations of 1915 may be performed by an SUO component as described with reference to FIGS. 9 through 12.

At 1920, the UE may communicate with the base station as part of a SUO using one of the first RAT or the second RAT based on the timing offset. The operations of 1920 may be performed according to the methods described herein. In some examples, aspects of the operations of 1920 may be performed by an SUO component as described with reference to FIGS. 9 through 12.

Figure 20:
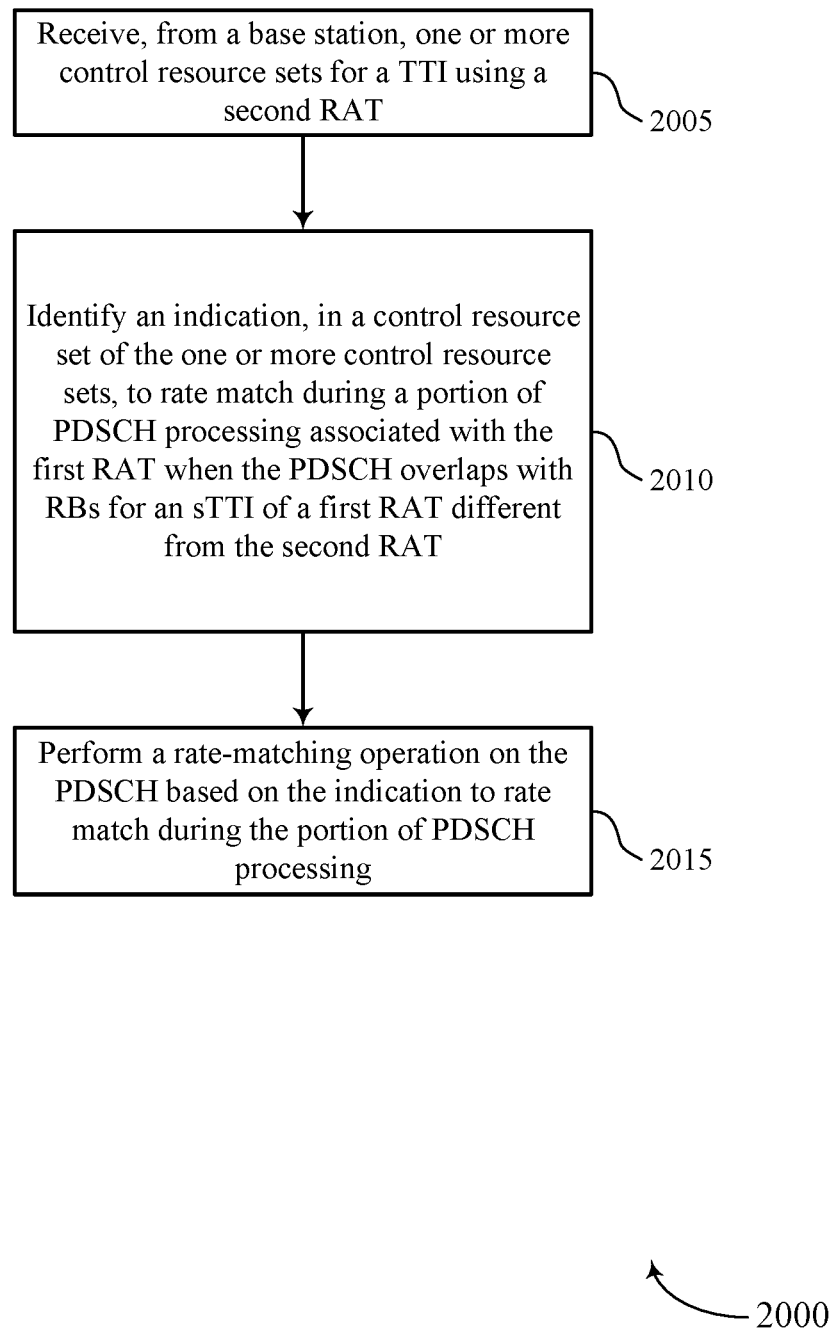

FIG. 20 shows a flowchart illustrating a method 2000 that supports TTI integration for multiple RATs in accordance with aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, one or more CORESETs for a TTI using a second RAT. The operations of 2005 may be performed according to the methods described herein. In some examples, aspects of the operations of 2005 may be performed by a rate-matching component as described with reference to FIGS. 9 through 12.

At 2010, the UE may identify an indication, in a CORESET of the one or more CORESETs, to rate match during a portion of PDSCH processing associated with the second RAT when the PDSCH overlaps with RBs for an sTTI of a first RAT different from the second RAT. The operations of 2010 may be performed according to the methods described herein. In some examples, aspects of the operations of 2010 may be performed by a rate-matching component as described with reference to FIGS. 9 through 12.

At 2015, the UE may perform a rate-matching operation on the PDSCH based on the indication to rate match during the portion of PDSCH processing. The operations of 2015 may be performed according to the methods described herein. In some examples, aspects of the operations of 2015 may be performed by a rate-matching component as described with reference to FIGS. 9 through 12.

Figure 21:
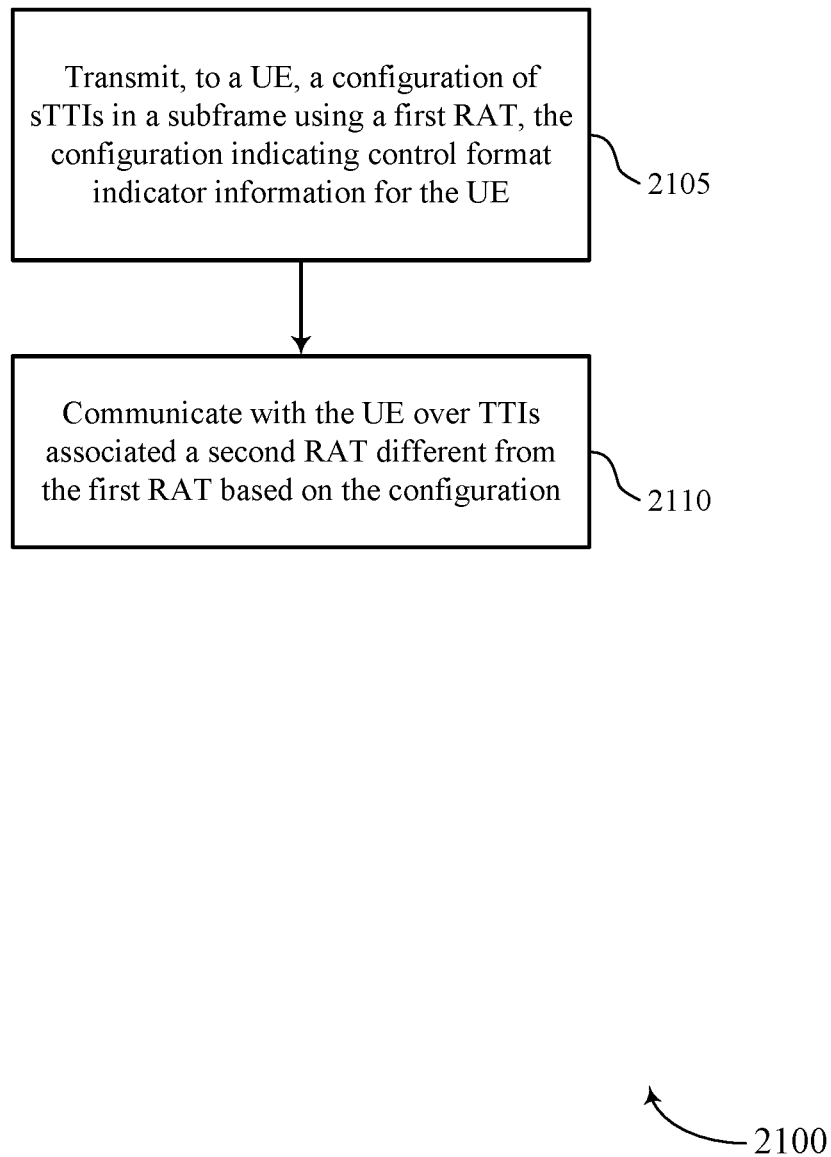

FIG. 21 shows a flowchart illustrating a method 2100 that supports TTI integration for multiple RATs in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a configuration of sTTIs in a subframe using a first RAT, the configuration indicating control format indicator information for the UE. The operations of 2105 may be performed according to the methods described herein. In some examples, aspects of the operations of 2105 may be performed by an sTTI transmission component as described with reference to FIGS. 13 through 16.

At 2110, the base station may communicate with the UE over TTIs associated a second RAT different from the first RAT based on the configuration. The operations of 2110 may be performed according to the methods described herein. In some examples, aspects of the operations of 2110 may be performed by a TTI integration component as described with reference to FIGS. 13 through 16.

Figure 22:
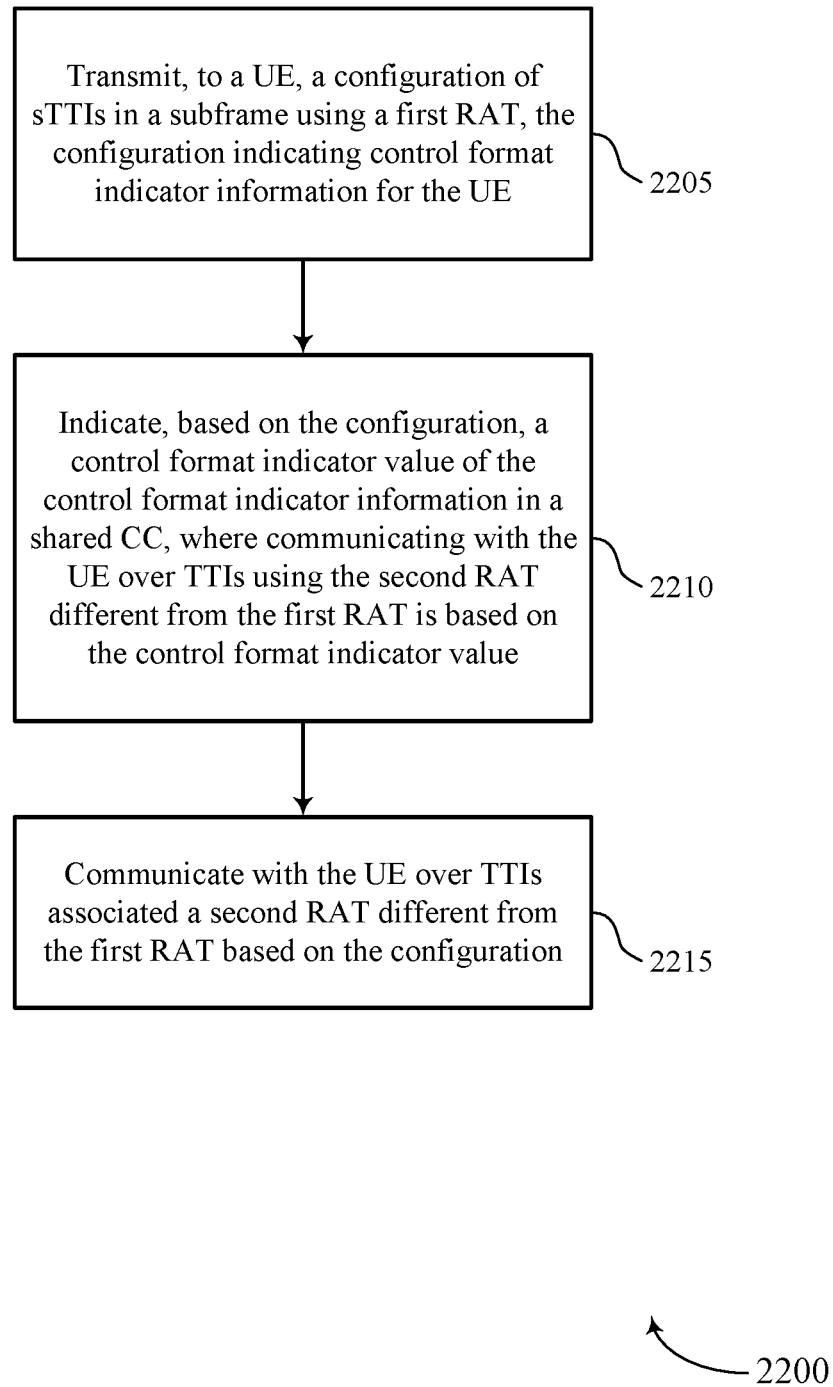

FIG. 22 shows a flowchart illustrating a method 2200 that supports TTI integration for multiple RATs in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a configuration of sTTIs in a subframe using a first RAT, the configuration indicating control format indicator information for the UE. The operations of 2205 may be performed according to the methods described herein. In some examples, aspects of the operations of 2205 may be performed by a sTTI transmission component as described with reference to FIGS. 13 through 16.

At 2210, the base station may indicate, based on the configuration, a control format indicator value of the control format indicator information in a shared CC, where communicating with the UE over TTIs using the second RAT different from the first RAT is based on the control format indicator value. The operations of 2210 may be performed according to the methods described herein. In some examples, aspects of the operations of 2210 may be performed by a control format indicator component as described with reference to FIGS. 13 through 16.

At 2215, the base station may communicate with the UE over TTIs associated a second RAT different from the first RAT based on the configuration. The operations of 2215 may be performed according to the methods described herein. In some examples, aspects of the operations of 2215 may be performed by a TTI integration component as described with reference to FIGS. 13 through 16.

Figure 23:
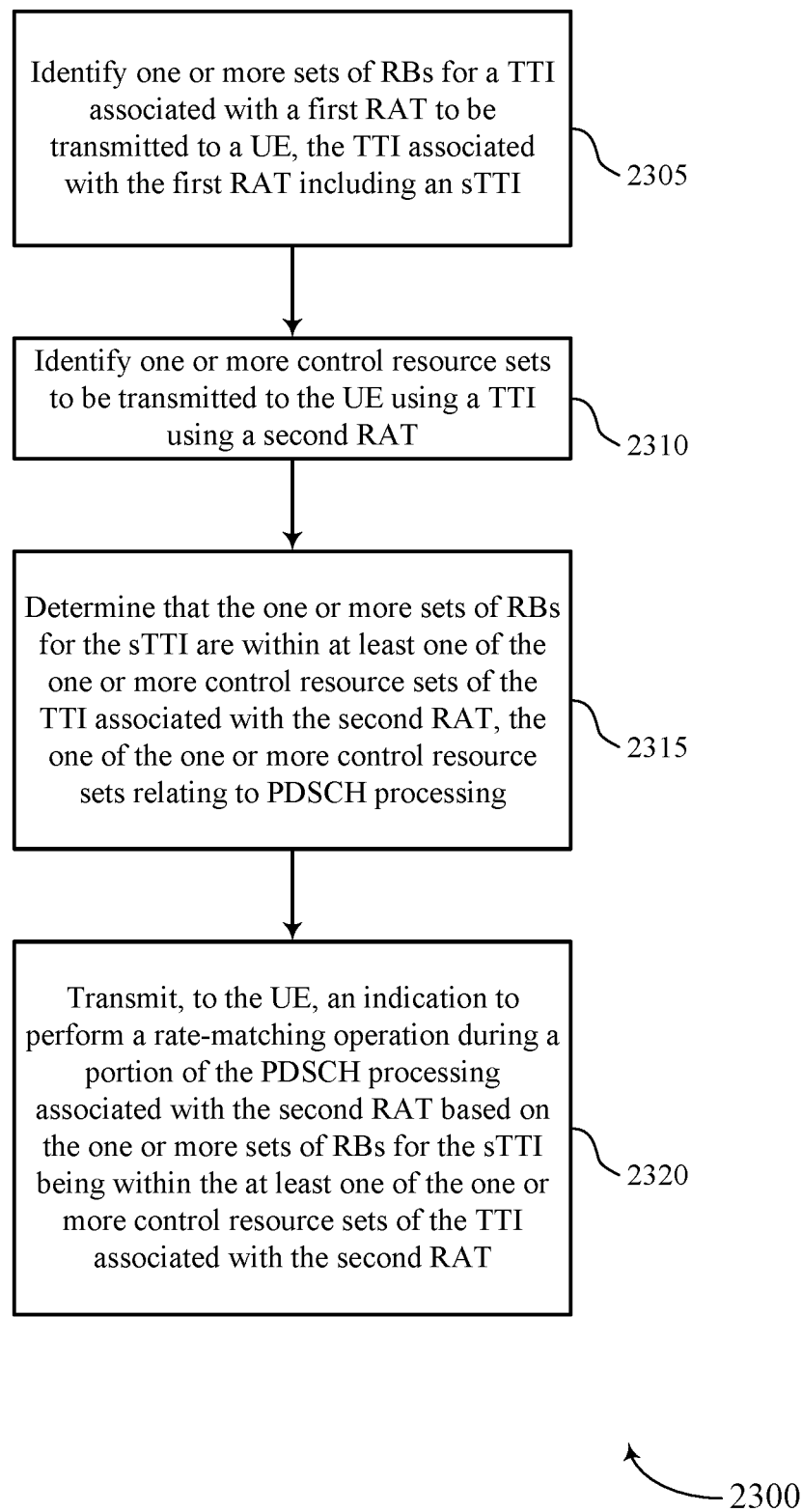

FIG. 23 shows a flowchart illustrating a method 2300 that supports TTI integration for multiple RATs in accordance with aspects of the present disclosure. The operations of method 2300 may be implemented by a base station 105 or its components as described herein. For example, the operations of method 2300 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may identify one or more sets of RBs for a TTI associated with a first RAT to be transmitted to a UE, the TTI associated with the first RAT including an sTTI. The operations of 2305 may be performed according to the methods described herein. In some examples, aspects of the operations of 2305 may be performed by a rate-matching indicator as described with reference to FIGS. 13 through 16.

At 2310, the base station may identify one or more CORESETs to be transmitted to the UE using a TTI using a second RAT. The operations of 2310 may be performed according to the methods described herein. In some examples, aspects of the operations of 2310 may be performed by a rate-matching indicator as described with reference to FIGS. 13 through 16.

At 2315, the base station may determine that the one or more sets of RBs for the sTTI are within at least one of the one or more CORESETs of the TTI associated with the second RAT, the one of the one or more CORESETs relating to PDSCH processing. The operations of 2315 may be performed according to the methods described herein. In some examples, aspects of the operations of 2315 may be performed by a rate-matching indicator as described with reference to FIGS. 13 through 16.

At 2320, the base station may transmit, to the UE, an indication to perform a rate-matching operation during a portion of the PDSCH processing associated with the second RAT based on the one or more sets of RBs for the sTTI being within the at least one of the one or more CORESETs of the TTI associated with the second RAT. The operations of 2320 may be performed according to the methods described herein. In some examples, aspects of the operations of 2320 may be performed by a rate-matching indicator as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one" of or "one" or "more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a configuration for a subframe of shortened transmission time intervals (sTTIs) associated with a first radio access technology (RAT), the configuration indicating control format indicator information for the UE, wherein the control format indicator information signals a layout of the subframe and wherein the configuration for the subframe of sTTIs can be used for first communications on the first RAT and second communications on a second RAT different from the first communications, the second RAT being different from the first RAT; and
   communicating with the base station during the subframe over transmission time intervals (TTIs) associated with the second communications on the second RAT based at least in part on the configuration for the subframe of sTTIs.

2. The method of claim 1, further comprising:
   identifying, based at least in part on the configuration for the subframe of sTTIs, a control format indicator value of the control format indicator information semi-statically configured in a shared component carrier (CC), wherein a configuration of the TTIs is a configuration for a multimedia broadcast single frequency network (MBSFN) subframe or a configuration for a non-MBSFN subframe; and
   communicating with the base station over the TTIs associated with the second RAT different from the first RAT based at least in part on the identified control format indicator value.

3. The method of claim 1, further comprising:
   identifying, based at least in part on the configuration, a control format indicator value from the control format indicator information in at least three symbols at the beginning of the subframe, wherein communicating with the base station is based at least in part on identifying the control format indicator value.

4. The method of claim 1, wherein an end of a TTI of the TTIs of the second RAT is aligned with an end of an sTTI of sTTIs of the first RAT.

5. The method of claim 1, wherein a boundary of each TTI of the TTIs of the second RAT is aligned with a boundary of a respective sTTI of the sTTIs of the first RAT such that each TTI of the TTIs of the second RAT spans a length less than or equal a length of the respective sTTI of the sTTIs of the first RAT.

6. The method of claim 1, wherein a TTI of the TTIs of the second RAT spans a single sTTI boundary between two sTTIs of the first RAT.

7. The method of claim 1, wherein the sTTIs of the first RAT are each confined within a slot of the subframe, and wherein the second RAT is associated with new radio communications.

8. The method of claim 1, further comprising:
receiving, from the base station, a second configuration of sTTIs in a subframe for the first RAT, wherein the second configuration of sTTIs comprises a configuration for a multimedia broadcast single frequency network (MBSFN) subframe or a configuration for a non-MBSFN subframe; and
identifying, based at least in part on the second configuration of sTTIs, a control format indicator value from the control format indicator information by decoding a physical control format indicator channel (PCFICH) or based at least in part on a semi-static indication associated with the control format indicator information, wherein communicating with the base station is based at least in part on the control format indicator value.

9. The method of claim 1, further comprising:
identifying, based at least in part on the configuration, a control format indicator value of the control format indicator information by decoding a physical control format indicator channel (PCFICH), wherein communicating with the base station is based at least in part on the control format indicator value.

10. The method of claim 1, further comprising:
determining whether a control format indicator value of the control format indicator information is greater than a semi-static indication associated with the control format indicator information, wherein communicating with the base station over TTIs using the second RAT different from the first RAT is based at least in part on whether the control format indicator value of the control format indicator information is greater than the semi-static indication associated with the control format indicator information.

11. The method of claim 1, further comprising:
receiving, from the base station using the first RAT, an sTTI comprising a first downlink channel for the first RAT;
receiving, from the base station using the second RAT, a TTI comprising a second downlink channel for the second RAT; and
determine a capability of the UE to decode the first downlink channel for the first RAT and the second downlink channel for the second RAT within an operation constraint, wherein the operation constraint comprises a timing constraint for the UE, a power constraint for the UE, a bandwidth constraint for the UE, or an enhanced downlink channel is supported by the first RAT, or a combination thereof.

12. The method of claim 11, further comprising:
determining a priority of the first RAT and the second RAT; and
refraining from decoding one of the first downlink channel for the first RAT and the second downlink channel for the second RAT based at least in part on the determined capability, the determined priority, or a combination thereof.

13. The method of claim 12, wherein determining the priority of the first RAT and the second RAT comprises:
determining the priority based at least in part on: a total processing time for the UE to decide the first downlink channel and the second downlink channel, or a timing of reception of the sTTI comprising the first downlink channel and a timing of reception of the TTI comprising the second downlink channel, the first RAT being associated with LTE and the second RAT being associated with 5G, or a type of traffic for the second RAT being associated with low latency data, or some combination thereof.

14. The method of claim 12, further comprising:
determining a constraint on a processing time of the first RAT relative to the second RAT, the constraint on the processing time comprising the first downlink channel for the first RAT or the second downlink channel for the second RAT being in an exclusion window, a number of resource blocks (RBs), a number of component carriers (CCs), a maximum transport block size (TBS), a length of a control resource set for the second RAT, a length of a RB set for the first RAT, or a reference signal type used for an sTTI RB set for the first RAT, or a combination thereof, wherein refraining from decoding one of the first downlink channel for the first RAT or the second downlink channel for the second RAT is based at least in part on the constraint on the processing time.

15. The method of claim 14, further comprising:
reporting a size of the exclusion window in a UE capability message, wherein the size of the exclusion window is based at least in part on a capability of the UE to support different length sTTIs for the first RAT and the configuration for the subframe of sTTIs, different length TTIs for the second RAT, or both.

16. The method of claim 1, further comprising:
identifying a collision of a first uplink message for the first RAT and a second uplink message for the second RAT;
determining a priority of the first uplink message or the second uplink message, wherein the priority is based at least in part on the first RAT and the second RAT, an alignment of a starting boundary for the first uplink message and the second uplink message, a timing of when downlink grants for the first uplink message and the second uplink message are received, a UE capability, a gap between starting boundaries between the first uplink message and the second uplink message, or a combination thereof; and
transmitting one of the first uplink message for the first RAT or the second uplink message for the second RAT based at least in part on the determined priority, wherein at least a portion of uplink control information for the first uplink message or the second uplink message is transmitted with the other of the first uplink message or the second uplink message.

17. The method of claim 1, further comprising:
allocating a first power for a transmission on one TTI of the TTIs of the second RAT; and
allocating a second power different from the first power for a transmission on one sTTI of the sTTIs of the first RAT, wherein one of the first power or the second power comprises a maximum power or a minimum power for the UE.

18. A method for wireless communications at a user equipment (UE), comprising:
receiving, from a base station, a configuration for the UE to operate on a first carrier associated with a first radio access technology (RAT) and on a second carrier associated with a second RAT different from the first RAT;

determining a symbol configuration for a physical uplink control channel (PUCCH) group based at least in part on the configuration, the symbol configuration comprising a length of a shortened transmission time interval (sTTI), wherein the symbol configuration can be used for first communications on the first RAT and second communications on the second RAT different from the first communications;

configuring a timing offset between a downlink duration and an uplink duration for the UE to transmit an uplink message to the base station based at least in part on the determined symbol configuration; and communicating with the base station as part of a single uplink operation (SUO) using one of the first RAT or the second RAT based at least in part on the timing offset.

19. The method of claim 18, further comprising:
determining a timeline related to a downlink/uplink reference configuration for the UE to transmit an uplink signal to the base station after receiving a downlink signal from the base station based at least in part on a first quantity of downlink symbols and a second quantity of uplink symbols within the determined symbol configuration and the timing offset, wherein configuring the timing offset is based at least in part on an operation associated with the first RAT or an operation associated with an sTTI, and wherein the second RAT is associated with new radio communications.

20. The method of claim 18, further comprising:
transmitting the uplink message in a second slot in a second subframe after the timing offset based at least in part on receiving a downlink grant in a subslot of a first slot in a first subframe, wherein the uplink message comprises an acknowledgment message; and
transmitting the uplink message in the second slot in the second subframe after the timing offset based at least in part on receiving an uplink grant in the subslot of the first slot in the first subframe, wherein the uplink message comprises a shortened uplink message.

21. The method of claim 18, further comprising:
transmitting the uplink message in a second subframe after the timing offset based at least in part on receiving a downlink grant in a first subframe, wherein the uplink message comprises an acknowledgement message; and
transmitting the uplink message in an sTTI in the second subframe after the timing offset based at least in part on receiving the downlink grant in an sTTI in the first subframe, wherein the uplink message comprises the acknowledgement message.

22. A method for wireless communications at a user equipment (UE), comprising:
receiving, from a base station, one or more control resource sets for a transmission time interval (TTI) associated with a first radio access technology (RAT);
identifying an indication, in a control resource set of the one or more control resource sets, to rate match during a portion of physical downlink shared channel (PDSCH) processing associated with the first RAT when the PDSCH overlaps with resource blocks (RBs) for a shortened transmission time interval (sTTI) of a second RAT different from the first RAT; and performing a rate-matching operation on the PDSCH associated with the first RAT based at least in part on the indication to rate match during the portion of PDSCH processing.

23. The method of claim 22, wherein identifying the indication comprises:
identifying the indication to rate match during the portion of PDSCH processing in a subset of one or more control resource sets.

24. The method of claim 22, wherein the rate-matching operation is based at least in part on a preconfigured behavior for the PDSCH overlapping the one or more control resource sets for the TTI.

25. The method of claim 22, wherein performing the rate-matching operation comprises:
mapping different types of uplink data to respective resource elements in an uplink message, and wherein the first RAT is associated with new radio communications.

26. The method of claim 22, wherein one of the one or more control resource sets comprising the indication to perform the rate-matching operation is configured semi-statically or dynamically.

27. The method of claim 22, wherein one of the one or more control resource sets comprising the indication to perform the rate-matching operation is configured with a monitoring periodicity associated with a control channel of the sTTI.

28. A method for wireless communications at a base station, comprising:
transmitting, to a UE, a configuration for a subframe of shortened transmission time intervals (sTTIs) associated with a first radio access technology (RAT), the configuration indicating control format indicator information for the UE, wherein the control format indicator information signals a layout of the subframe and wherein the configuration for the subframe of sTTIs can be used for first communications on the first RAT and second communications on a second RAT different from the first communications, the second RAT being different from the first RAT; and
communicating with the UE during the subframe over transmission time intervals (TTIs) associated with the second communications on the second RAT based at least in part on the configuration for the subframe of sTTIs.

29. The method of claim 28, further comprising:
indicating, based at least in part on the configuration, a control format indicator value of the control format indicator information in a shared component carrier (CC), wherein communicating with the UE over TTIs associated with the second RAT different from the first RAT is based at least in part on the control format indicator value.

30. The method of claim 28, further comprising:
transmitting a control format indicator value from the control format indicator information in at least one symbol in a set of symbols at the beginning of the subframe based at least in part on the configuration of the sTTIs associated with the first RAT, wherein the second RAT is associated with new radio communications.

* * * * *